US012278072B2

(12) United States Patent
Lu et al.

(10) Patent No.: US 12,278,072 B2
(45) Date of Patent: Apr. 15, 2025

(54) CIRCUIT BREAKER

(71) Applicant: ZHEJIANG CHINT ELECTRICS CO., LTD., Zhejiang (CN)

(72) Inventors: Kejun Lu, Zhejiang (CN); An Yang, Zhejiang (CN)

(73) Assignee: ZHEJIANG CHINT ELECTRICS CO., LTD. (CN)

( * ) Notice: Subject to any disclaimer, the term of this patent is extended or adjusted under 35 U.S.C. 154(b) by 260 days.

(21) Appl. No.: 17/918,430

(22) PCT Filed: Dec. 26, 2020

(86) PCT No.: PCT/CN2020/139728

§ 371 (c)(1),
(2) Date: Oct. 12, 2022

(87) PCT Pub. No.: WO2021/208492

PCT Pub. Date: Oct. 21, 2021

(65) Prior Publication Data

US 2023/0143348 A1 May 11, 2023

(30) Foreign Application Priority Data

Apr. 13, 2020 (CN) ......................... 202010285127.8

(51) Int. Cl.
*H01H 71/58* (2006.01)
*H01H 71/02* (2006.01)
*H01H 71/04* (2006.01)
*H01H 71/08* (2006.01)
*H01H 71/70* (2006.01)

(52) U.S. Cl.
CPC ............ *H01H 71/58* (2013.01); *H01H 71/02* (2013.01); *H01H 71/04* (2013.01); *H01H 71/08* (2013.01); *H01H 71/70* (2013.01)

(58) Field of Classification Search
CPC ........ H01H 71/58; H01H 71/02; H01H 71/04; H01H 71/08; H01H 71/70; H01H 3/26;
(Continued)

(56) References Cited

U.S. PATENT DOCUMENTS 7,342,474 B2 * 3/2008 Castonguay ........... H01H 89/08
335/14
11,961,690 B2 * 4/2024 Lu ............................ H01H 9/20
(Continued)

FOREIGN PATENT DOCUMENTS

CN 108493063 A 9/2018
CN 207993787 U 10/2018
(Continued)

OTHER PUBLICATIONS

International Search Report mailed Mar. 25, 2021 in corresponding PCT International Application No. PCT/CN2020/139728.

*Primary Examiner* — Lheiren Mae A Caroc
(74) *Attorney, Agent, or Firm* — OSTROLENK FABER LLP

(57) ABSTRACT

A circuit breaker that includes a circuit breaker housing, a button mechanism arranged inside the circuit breaker housing, an operating mechanism connected with the button mechanism, a movable contact connected with the operating mechanism, a static contact co-operated with the movable contact, the button mechanism being operable to enable the circuit breaker to switch on/switch off by means of the operating mechanism; the circuit breaker also includes an electric mechanism arranged inside the circuit breaker housing, the electric mechanism is drivingly co-operated with the button mechanism or the operating mechanism, the electric mechanism can actuate the circuit breaker to switch on/switch off by means of the operating mechanism, or the electric mechanism can actuate the circuit breaker to switch
(Continued)

on/switch off by means of the cooperation of the button mechanism.

13 Claims, 16 Drawing Sheets

(58) Field of Classification Search
CPC ............ H01H 9/24; H01H 9/34; H01H 13/68; H01H 71/2463; H01H 73/08; H01H 3/40; H01H 71/10
See application file for complete search history.

(56) References Cited

U.S. PATENT DOCUMENTS 11,972,919 B2 * 4/2024 Lu ........................ H01H 71/505
2023/0012081 A1 * 1/2023 Lu .......................... H01H 71/04
2023/0146221 A1 * 5/2023 Lu ...................... H01H 71/1054
200/43.11

FOREIGN PATENT DOCUMENTS

| | | | |
|---|---|---|---|
| CN | 109585233 | A | 4/2019 |
| CN | 111477509 | A | 7/2020 |
| CN | 111489933 | A | 8/2020 |
| CN | 111681922 | A | 9/2020 |
| CN | 111681923 | A | 9/2020 |
| CN | 111799135 | A | 10/2020 |
| CN | 111916317 | A | 11/2020 |
| CN | 111986960 | A | 11/2020 |
| CN | 212277116 | U | 1/2021 |
| CN | 212277118 | U | 1/2021 |
| EP | 2131376 | A1 | 12/2009 |

* cited by examiner

CIRCUIT BREAKER

CROSS-REFERENCE TO RELATED APPLICATIONS

The present application is a 35 U.S.C. §§ 371 national stage application of International Application No. PCT/CN2020/139728, filed Dec. 26, 2020, which claims priority to Chinese Patent Application No. CN202010285127.8, filed Apr. 13, 2020, the contents of both of which are incorporated herein by reference.

FIELD OF THE INVENTION

The present invention relates to the field of low-voltage appliance, in particular to a circuit breaker.

BACKGROUND OF THE INVENTION

Circuit breakers can effectively improve the use safety of electrical equipment, and can be sorted into a plug-in type, a fixed-type and a drawer-type according to their installation ways. With the development of the electrical equipment's miniaturization, correspondingly, the overall structures and operation modes of the circuit breakers also have to be gradually upgraded. Among them, plug-in circuit breakers are widely used in communication equipment due to their advantages of compact structure, space saving and convenient installation. However, with the development of the IoT technology, the plug-in circuit breakers of the existing technology cannot meet the requirements of remote monitoring and control.

SUMMARY OF THE INVENTION

The present invention aims to overcome the defects of the prior art, providing a circuit breaker, of which an electric mechanism realizes the remote control of the circuit breaker.

In order to achieve the above object, the technical scheme adopted in the present invention is as follows:

A circuit breaker, comprising a circuit breaker housing 1; and a button mechanism 2, an operating mechanism connected with the button mechanism 2, a movable contact 60 connected with the operating mechanism, and a static contact 61 co-operated with the movable contact 60 are all arranged in said breaker housing 1; operating the button mechanism 2 enables the circuit breaker to switch on/switch off by means of the operating mechanism; the circuit breaker further includes an electric mechanism **2*c* arranged inside the circuit breaker housing 1, the electric mechanism 2*c* is drivingly co-operated with the button mechanism 2 or the operating mechanism, the electric mechanism 2*c* can actuate the circuit breaker to switch on/switch off by means of the operating mechanism, or the electric mechanism 2*c* can actuate the circuit breaker to switch on/switch off by means of the button mechanism 2**.

Preferably, the operating mechanism includes a bar linkage, and a transmission member 4 and a lever mechanism pivotally arranged on the circuit breaker housing 1, the bar linkage includes a connecting rod structure 33 and a transmission connecting rod 32, the button mechanism 2 is drivingly connected to the transmission member 4 through the connecting rod structure 33, the transmission member 4 is drivingly connected to the lever mechanism through the transmission connecting rod 32; and the lever mechanism is drivingly connected with the movable contact 60; when operating the button mechanism 2 to enable the circuit breaker to switch on/switch off, the button mechanism 2 drives the transmission member 4 to rotate in a first direction/second direction through the connecting rod structure 33, and said second direction and said first direction are opposite to each other.

Preferably, the button mechanism 2 includes a first button 20 slidably arranged inside the circuit breaker housing 1, the connecting rod structure 33 includes a first connecting rod 30, the first button 20 is drivingly connected to the transmission member 4 through the first connecting rod 30; when pressing the first button 20 toward the inside of the circuit breaker housing 1 enables the circuit breaker to switch on, the first button 20 drives the transmission member 4 to rotate in the first direction; when pulling the first button 20 toward the outside of the circuit breaker housing 1 to enable the circuit breaker to switch off, the first button 20 drives the transmission member 4 to rotate in the second direction; the electric mechanism **2*c* is drivingly cooperated with the first button 20** to drive the circuit breaker to switch on/switch off.

Preferably, the button mechanism 2 includes a first button 20 and a second button 21 slidably arranged inside the circuit breaker housing 1 respectively, and the first button 20 and the second button 21 are parallelly arranged and synchronously move in two directions opposite to one another; the connecting rod structure 33 includes a first connecting rod 30 and a second connecting rod 31, the first button 20 is drivingly connected to the transmission member 4 through the first connecting rod 30, and the second button 21 is drivingly connected to the transmission member 4 through the second connecting rod 31; when pressing the first button 20 toward the inside of the circuit breaker housing 1 to enable the circuit breaker to switch on, the first button 20 drives the transmission member 4 to rotate in the first direction, meanwhile the second button 21 moves toward the outside of the circuit breaker; when pressing the second button 21 toward the inside of the circuit breaker housing 1 to enable the circuit breaker to switch off, the second button 21 drives the transmission member 4 to rotate in the second direction through the second connecting rod 31, meanwhile the first button 20 moves toward the outside of the circuit breaker; the electric mechanism **2*c* drivingly cooperates with said first button 20 or said second button 21** to enable the circuit breaker to switch on/switch off.

Preferably, the electric mechanism **2*c* includes a driving motor 20*c*, a transmission gear set and a transmission rack 26*c*, the driving motor 20*c* is drivingly co-operated with the transmission rack 26*c* through the transmission gear set, and the transmission rack 26*c* is drivingly co-operated with the button mechanism 2**.

Preferably, the first button 20 includes a rack limiting groove 2030 arranged on one side thereof, the transmission rack **26*c* is arranged in the rack limiting groove 2030, and the rack limiting groove 2030 includes a switch-on side surface 2032 and a switch-off side surface 2031** respectively arranged at both ends thereof;

when the circuit breaker switches on, the transmission rack **26*c* moves from a first initial position toward the switch-on side surface 2032 till said transmission rack 26*c* contacts with the latter, then the transmission rack 26*c* continues to move and drives the first button 20 to move toward the inside of the circuit breaker housing 1 through the switch-on side surface 2032, after the circuit breaker has switched on, the transmission rack 26*c* returns back to the first initial position; when the circuit breaker switches off, the transmission rack 26*c* moves toward the switch-off side surface 2031 to contact with the latter, then the transmission rack 26*c* continues to move and drives the first button 20 to move toward the outside of the circuit breaker housing 1 through the switch-off side surface 2031, after the circuit breaker has broken contact, the transmission rack 26***c* returns to the first initial position.

Preferably, the first button 20 and the transmission rack 26*c* are fixedly connected to each other, and the transmission gear set includes a first fan-shaped gear 251*c* drivingly engaged with the transmission rack 26*c;* when the circuit breaker switches on, the first fan-shaped gear 251*c* rotates in the first direction and drives the first button 20 to move toward the inside of the circuit breaker housing 1 through the transmission rack 26*c*, thus the circuit breaker switches on and the first fan-shaped gear 251*c* rotates to its disengagement from the transmission rack 26*c*; when the circuit breaker switches off, the first fan-shaped gear 251*c* rotates in the second direction and drives the first button 20 to move toward the outside of the circuit breaker housing 1 through the transmission rack 26*c*, thus the circuit breaker switches off and the first fan-shaped gear 251*c* rotates to its disengagement from the transmission rack 26*c*.

Preferably, the electric mechanism 2*c* is drivingly co-operated with the transmission member 4 to drive the circuit breaker to switch on/switch off, the electric mechanism 2*c* includes a motor 20*c*, a transmission gear set and a transmission member's gear 27*c* coaxially arranged with the transmission member 4, and the transmission gear set includes a switch-on and switch-off driving gear drivingly co-operated with the transmission member's gear 27*c;* the switch-on and switch-off driving gear drives the transmission member's gear 27*c* to rotate, and the transmission member's gear 27*c* drives the transmission member 4 to rotate, so as to enable the circuit breaker to switch on/switch off.

Preferably, the operating mechanism further includes a jump buckle 50, a lock catch 51 and a rotating plate 52 pivotally arranged on the circuit breaker housing 1, the jump buckle 50 and the lock catch 51 are pivotally arranged on the rotating plate 52, respectively, the jump buckle 50 and the lock catch 51 are locked with each other, and the rotating plate 52 is drivingly connected with the movable contact 60;

the electric mechanism 2*c* is drivingly co-operated with the transmission member 4 to drive the circuit breaker to switch on, and with the lock catch 51 to drive the circuit breaker to switch off, the electric mechanism 2*c* includes a driving motor 20*c*, a transmission gear set and a transmission member's gear 27*c* coaxially arranged with the transmission member 4, and the transmission gear set includes a fourth transmission gear 250*c* drivingly co-operated with the transmission gear 27*c* and a first fan-shaped gear 251*c* is coaxial linkage with the fourth transmission gear 250*c*; the operating mechanism further includes a trip-off lever 3*c* drivingly connected to the lock catch 51 and pivotally arranged; the fourth transmission gear 250*c* drives the trip-off lever 3*c* to rotate, and the trip-off lever 3*c* simultaneously drives the lock catch 51 to rotate, so as to release the locking co-operation of the lock catch 51 with the jump lock 50 and enable the circuit to switch off;

when the circuit breaker switches on, the first fan-shaped gear 251*c* rotates from a third initial position toward the second direction to its engagement with the transmission member's gear 27*c* and drives the transmission member's gear 27*c* to rotate from a second initial position toward the first direction, the transmission member's gear 27*c* drives the transmission member 4 to rotate in the first direction, the circuit breaker switches on and the first fan-shaped gear 251*c* rotates to its disengagement from the transmission member's gear 27*c*, then the transmission member's gear 27*c* automatically rotates to the second initial position and the transmission member 4 stays at a position by which said transmission member 4 stands on the moment that the circuit breaker switches on; when the circuit breaker switches off, the first fan-shaped gear 251*c* and the fourth transmission gear 250*c* continue to rotate in the second direction, the fourth transmission gear 250*c* drives the trip-off lever 3*c* to rotate, said trip-off lever 3*c* drives said lock catch 51 to rotates, so as to release the locking co-operation of the lock catch 51 with the jump buckle 50, thus the circuit breaker switches off and the first fan-shaped gear 251*c* continues to rotate to the third initial position.

Preferably, the circuit breaker further includes a short-circuit protection mechanism 7 and an overload protection mechanism 9 arranged inside the circuit breaker housing 1 and respectively drivingly co-operated with the operating mechanism, arc extinguishing system 8, a wire-inlet terminal 1*i* and a wire-outlet terminal 10; the circuit breaker further includes an electric mechanism 2*c* drivingly co-operated with the button mechanism 2 or the operating mechanism; the wire-outlet terminal 10 and the button mechanism 2 are arranged at one end of the circuit breaker housing 1, and the wire-inlet terminal 1*i* is arranged at the other end of the circuit breaker housing 1; the operating mechanism is positioned between the button mechanism 2 and the wire-inlet terminal 1*i*; the arc extinguishing system 8 and the short-circuit protection mechanism 7 are arranged side by side between the operating mechanism and the wire-inlet terminal 1*i*; the electric mechanism 2*c* is positioned between the operating mechanism and the wire-outlet terminal 10, and the electric mechanism 2*c* and the wire-outlet terminal 10 are positioned on the same side of the button mechanism 2; the overload protection mechanism 9 is positioned on one side of the operating mechanism and between the arc extinguishing system 8 and the wire-outlet terminal 10.

Preferably, the circuit breaker further includes a control circuit board 1*c* connected to the electric mechanism 2*c*; the control circuit board 1*c* is arranged between the bottom plate of the circuit breaker housing 1 and the electric mechanism 2*c*, the control circuit board 1*c* and the electric mechanism 2*c* are positioned on the same side of the button mechanism 2, and the control circuit board 1*c* is positioned between the wire-outlet terminal 10 and the operating mechanism.

Preferably, the circuit breaker further includes a control circuit board 1*c* connected to the electric mechanism 2*c*; the bottom plate of the circuit breaker housing 1 is positioned on one side of the control circuit board 1*c*, and the electric mechanism 2*c*, the operating mechanism and the arc extinguishing system 8 are positioned on the other side of the control circuit board 1*c*.

Preferably, the button mechanism 2 is arranged opposite to the short-circuit protection mechanism 7 and positioned on one side of the circuit breaker housing 1; the wire-outlet terminal 10 is arranged opposite to the arc extinguishing system 8 and positioned on the other side of the circuit breaker housing 1.

Preferably, the short-circuit protection mechanism 7 is an electromagnetic release; the overload protection mechanism 9 is a bimetallic strip drivingly co-operated with the jump buckle 51 of the operating mechanism, or the overload protection mechanism 9 is a current transformer coupled to the L-pole circuit of the circuit breaker and connected to the control circuit board 1*c*, or the overload protection mechanism 9 is a manganin resistor in series connection with the L-pole circuit of the circuit breaker, and the manganin resistor is connected to the control circuit board 1*c*; the circuit breaker further includes the control circuit board 1*c* connected to the electric mechanism 2*c* and a signal terminal connected to the control circuit board 1*c*, the signal terminal and the wire-inlet terminal 1*i* are arranged at the same end of the circuit breaker housing 1, and the signal terminal is positioned between the two wire-inlet terminals 1*i*.

The circuit breaker of the present invention comprises a button mechanism, an operating mechanism, an electric mechanism, and the electric mechanism being drivingly co-operated with the button mechanism or the operating mechanism, users can either manually operate the button mechanism to drive the circuit breaker to switch on/switch off, or actuate the circuit breaker to switch on/switch off by means of the co-operation of the electric mechanism and the operating mechanism or the co-operation of the electric mechanism and the button mechanism. Firstly, the operation method of the circuit breaker is diversified; secondly, the electric mechanism enables the circuit breaker to be remotely controlled.

In addition, the circuit breaker of the present invention includes a first button and a second button, which correspond to the switch-on and switch-off operations of the circuit breaker, respectively, and which bring about the following advantages. 1. Users can judge the switch-on/switch-off state of the circuit breaker by observing the states of the two buttons (that is, when the first button is pressed down and the second button comes up, the circuit breaker is in the switch-on state; when the first button comes up and the second button is pressed down, the circuit breaker is in the switch-off state). 2. Compared with the existing circuit breakers which switches off by pulling button, the circuit breaker of the present invention enables the circuit breaker to switch on and switch off by pressing the first button and the second button respectively, thus preventing the circuit breaker from being pulled out from the assembling position of the circuit breaker (such as a cabinet, etc.) due to the excessive force of pulling the buttons.

In addition, a wire-inlet terminal and a wire-outlet terminal are arranged at both ends of the circuit breaker housing respectively, helping to increase the creepage distance between the two terminals and improve the electrical safety of circuit breakers. The electric mechanism is positioned between the operating mechanism and the wire-out terminal, and the electric mechanism and the wire-out terminal are positioned on the same side of the button mechanism. The internal space of the circuit breaker housing is reasonably designed, and the layout of each part is compact, enabling the internal space of the circuit breaker housing to be utilized to the greatest extent, and helping to reduce the overall volume of the circuit breaker.

In addition, the bottom plate of the circuit breaker housing is positioned on one side of the control circuit board, and the electric mechanism, button mechanism, operating mechanism, short-circuit protection mechanism and the arc extinguishing system are positioned on the other side of the control circuit board; the above-mentioned stacking arrangement enables the control circuit board to take enough assembly space, so as to increase the size of the control circuit board, and abate the difficulty of arranging components on the control circuit board and the complexity of wiring on the control circuit board; more importantly, directly connecting to the wire-inlet terminal through the conductive lines arranged on the control circuit board excludes the difficulty of welding and wiring caused by the connection of separate flexible wires, and the control circuit board enables the circuit breaker to be remotely monitored and controlled.

DETAILED DESCRIPTION OF SOME EMBODIMENTS

Figure 1:
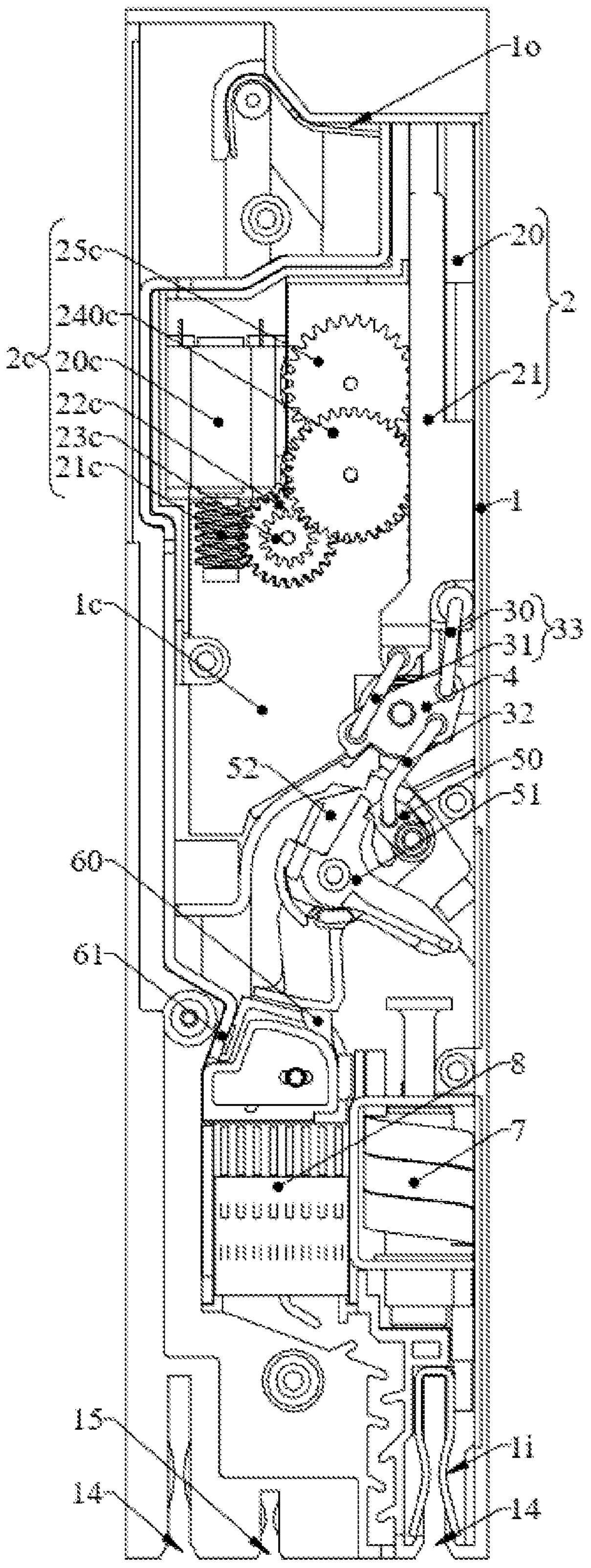
FIG. 1 is a structure diagram of the first embodiment of the circuit breaker of the present invention.

We further describe the embodiments of the plug-in circuit breaker according to the present invention as follows in combination with the examples shown in FIGS. 1-15C. The plug-in circuit breaker of the present invention is not limited to the description of the following embodiments.

The circuit breaker of the present invention includes the circuit breaker housing 1, the button mechanism 2, an operating mechanism connected with the button mechanism 2, the movable contact 60 connected with the operating mechanism, the static contact 61 co-operated with the movable contact 60, which are arranged in the circuit breaker housing 1 respectively; and the button mechanism 2 is operated to enable the circuit breaker to switch on/switch off by means of the operating mechanism; the circuit breaker also includes the electric mechanism 2*c* arranged in the circuit breaker housing 1; the electric mechanism 2*c* is drivingly co-operated with the button mechanism 2 or the operating mechanism; the electric mechanism 2*c* can actuate the circuit breaker to switch on/switch off by means of the operating mechanism, or the electric mechanism 2*c* can actuate the circuit breaker to switch on/switch off by means of the cooperation of the button mechanism 2 and the operating mechanism. The circuit breaker of the present invention includes the button mechanism 2, the operating mechanism, the electric mechanism 2*c*, and the electric mechanism 2*c* being drivingly co-operated with the button mechanism 2 or the operating mechanism; users can either manually operate the button mechanism 2 to drive the circuit breaker to switch on/switch off, or actuate the circuit breaker to switch on/switch off by means of the co-operation of the electric mechanism 2*c* and the operating mechanism or the co-operation of the electric mechanism 2*c* and the button mechanism 2. Firstly, the operation method of the circuit breaker is diversified; secondly, the electric mechanism 2*c* enables the circuit breaker to be remotely controlled.

Further, as a preferred solution of the present invention, the button mechanism 2 includes the first button 20 and the second button 21 respectively slidably arranged inside the circuit breaker housing 1; the operating mechanism includes a bar linkage, and the transmission member 4 and the lever mechanism pivotally arranged on the circuit breaker housing 1; the bar linkage includes the connecting rod structure 33 and the transmission connecting rod 32, and the connecting rod structure 33 includes the first connecting rod 30 and the second connecting rod 31; the first button 20 is drivingly connected to the transmission member 4 through the first connecting rod 30, the second button 21 is drivingly connected to the transmission member 4 through the second first connecting rod 31, the transmission member 4 is drivingly connected to the lever mechanism through the transmission connecting rod 32, and the lever mechanism is drivingly connected with the movable contact 60; when pressing the first button 20/second button 21 toward the inside of the circuit breaker housing 1 to enable the circuit breaker to switch on/switch off, the first button 20/second button 21 drives the transmission member 4 to rotate in a first direction/a second direction through the first connecting rod 30/the second connecting rod 31, and the second direction and the first direction are opposite to each other. The circuit breaker of the present invention includes the first button 20 and the second button 21, which correspond to the switch-on and switch-off operations of the circuit breaker, respectively, and which bring about the following advantages: 1. Users can judge the switch-on/switch-off state of the circuit breaker by observing the states of the two buttons (that is, when the first button 20 is pressed down and the second button 21 comes up, the circuit breaker is in the switch-on state; when the first button 20 comes up and the second button 21 is pressed down, the circuit breaker is in the switch-off state). 2. Compared with the existing circuit breakers which switch off by pulling button, the circuit breaker of the present invention enables the circuit breaker to switch on and switch off by pressing the first button 20 and the second button 21 respectively, thus preventing the circuit breaker from being pulled out from the assembling position of the circuit breaker (such as a cabinet, etc.) due to the excessive force on pulling the buttons.

The circuit breaker of the present invention further includes the short circuit protection mechanism 7, the overload protection mechanism 9, the arc extinguishing system 8, the wire-inlet terminal 1*i* and the wire-outlet terminal 10 all arranged in the circuit breaker housing 1; the short-circuit protection mechanism 7 and the overload protection mechanism 9 are drivingly co-operated with the operating mechanism respectively; the wire-outlet terminal 10 and the button mechanism 2 are arranged at one end of the circuit breaker housing 1, and the wire-inlet terminal 1*i* is arranged at the other end of the circuit breaker housing 1; the operating mechanism is positioned between the button mechanism 2 and the wire-inlet terminal 1*i*; the arc extinguishing system 8 and the short-circuit protection mechanism 7 are arranged side by side between the operating mechanism and the wire-inlet terminal 1*i*; the electric mechanism 2*c* is positioned between the operating mechanism and the wire-outlet terminal 10, and the electric mechanism 2*c* and the wire-outlet terminal 10 are positioned on the same side of the button mechanism 2; the overload protection mechanism is positioned on one side of the operating mechanism and between the arc extinguishing system 8 and the wire-outlet terminal 10. Of the present invention, the wire-inlet terminal 1*i* and the wire-outlet terminal 10 are arranged at both ends of the circuit breaker housing 1 respectively, helping to increase the creepage distance between the two terminals and improve the electrical safety of circuit breakers, the electric mechanism 2*c* is positioned between the operating mechanism and the wire-out terminal 10, and the electric mechanism 2*c* and the wire-out terminal 10 are positioned on the same side of the button mechanism 2, so that the internal space of the circuit breaker housing 1 is reasonably designed, and the layout of each part is compact, enabling the internal space of the circuit breaker housing 1 to be utilized to the greatest extent, and helping to reduce the overall volume of the circuit breaker.

Further, the circuit breaker of the present invention also includes the control circuit board 1*c* connected to the electric mechanism 2*c*, the bottom plate of the circuit breaker housing 1 is positioned on one side of the control circuit board 1*c*, and the electric mechanism 2*c*, the operating mechanism and the arc extinguishing system 8 are positioned on the other side of the control circuit board 1*c*. The above-mentioned stacking arrangement enables the control circuit board 1*c* to take enough assembly space, so as to increase the size of the control circuit board 1*c*, and abate the difficulty of arranging components on the control circuit board 1*c* and the complexity of wiring process on the control circuit board 1*c*. More importantly, directly connecting to the wire-inlet terminal 1*i* by means of the conductive lines arranged on the control circuit board 1*c* excludes the difficulty of welding and wiring caused by the connection of separate flexible wires.

We shall further describe the circuit breaker of the present invention with reference to the figures and specific examples as follows.

As shown in FIGS. 1, 9-15C, the circuit breaker of the present invention includes the circuit breaker housing 1, the button mechanism 2 arranged inside the circuit breaker housing 1, an operating mechanism connected with the button mechanism 2, the movable contact 60 connected with the operating mechanism, the static contact 61 co-operated with the movable contact 60, and the button mechanism 2 being operated to enable the circuit breaker to switch on/switch off by means of the operating mechanism, so as to enable the movable contact 60 and the static contact 61 to be connected/disconnected.

Preferably, as shown in FIG. 1, the operating mechanism includes the bar linkage, and the transmission member 4 and the lever mechanism pivotally arranged on the circuit breaker housing 1; the bar linkage includes the connecting rod structure 33 and the transmission connecting rod 32; the button mechanism 2 is drivingly connected to the transmission member 4 through the connecting rod structure 33, the transmission member 4 is drivingly connected to the lever mechanism through the transmission connecting rod 32, and the lever mechanism is drivingly connected with the movable contact 60; when operating the button mechanism 2 to enable the circuit breaker to switch on/switch off, the button mechanism 2 drives the transmission member 4 to rotate in a first direction/second direction through the connecting rod structure 33, and the second direction and the first direction are opposite to each other; the electric mechanism 2*c* is drivingly co-operated with the button mechanism 2 or the transmission member 4.

Preferably, as shown in FIG. 1, the lever mechanism includes the jump buckle 50, the lock catch 51 and the rotating plate 52 pivotally arranged on the circuit breaker housing 1, the jump buckle 50 and the lock catch 51 are locked with each other and pivotally arranged on the rotating plate 52 respectively; the rotating plate 52 is drivingly connected with the movable contact 60. It should be pointed that the lever mechanism may adopt a four-bar linkage and other multi-bar linkages, as they pertain to the prior art in the art, details for them are not described herein again.

Specifically, as shown in FIG. 1, the first direction is a clockwise direction, and the second direction is a counterclockwise direction.

Figure 9:
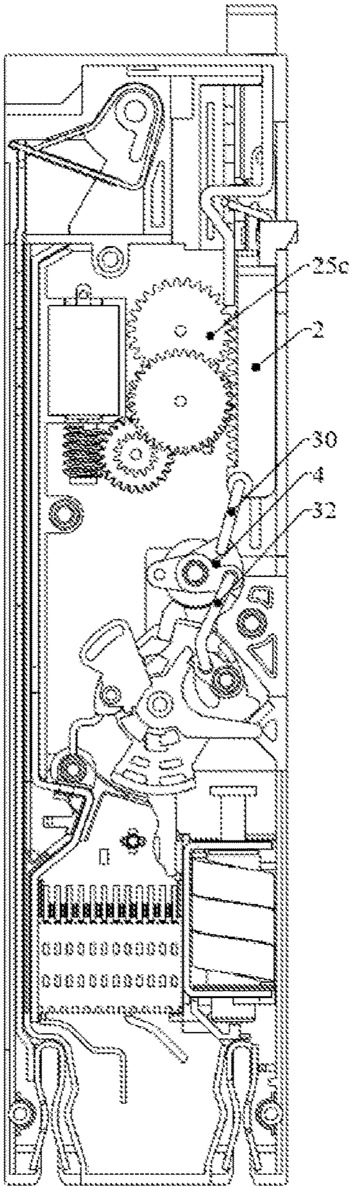
FIG. 9 is a structure diagram of the second embodiment of the circuit breaker of the present invention.

Preferably, as shown in FIG. 9, an embodiment is provided, of which the button mechanism 2 only includes one button. The button mechanism 2 includes the first button 20 slidably arranged inside the circuit breaker housing 1, the connecting rod structure 33 includes the first connecting rod 30, the first button 20 is drivingly connected to the transmission member 4 through the first connecting rod 30; when pressing the first button 20 toward the inside of the circuit breaker housing 1 to enable the circuit breaker to switch on, the first button 20 drives the transmission member 4 to rotate in a first direction; when pulling the first button 20 toward the outside of the circuit breaker housing 1 to enable the circuit breaker to switch off, the first button 20 drives the transmission member 4 to rotate in a second direction. Further, as shown in FIG. 9, of the first button 20, one end protrudes outside the circuit breaker housing 1, and the other end is drivingly connected to the transmission member 4 through the first connecting rod 30; when pressing down the first button 20 to enable the circuit breaker to switch on, the first button 20 drives the transmission member 4 to rotate clockwise through the first connecting rod 30; when pulling up the first button 20 to enable the circuit breaker to switch off, the first button 20 drives the transmission member 4 to rotate counterclockwise through the first connecting rod 30.

Preferably, as shown in FIGS. 1, 7A-8B, 10A-13A and 15A-15C, another embodiment is provided, of which the button mechanism 2 includes two buttons, which is a preferred solution of the present invention. The button mechanism 2 includes the first button 20 and the second button 21 all slidably arranged inside the circuit breaker housing 1, and the first button 20 and the second button 21 are parallelly arranged and synchronously move in two directions opposite to one another; the connecting rod structure 33 includes the first connecting rod 30 and the second connecting rod 31, the first button 20 is drivingly connected to the transmission member 4 through the first connecting rod 30, and the second button 21 is drivingly connected to the transmission member 4 through the second connecting rod 31; when pressing the first button 20 toward the inside of the circuit breaker housing 1 to enable the circuit breaker to switch on, the first button 20 drives the transmission member 4 to rotate in the first direction, meanwhile the second button 21 moves toward the outside of the circuit breaker; when pressing the second button 21 toward the inside of the circuit breaker housing 1 to enable the circuit breaker to switch off, the second button 21 drives the transmission member 4 to rotate in the second direction through the second connecting rod 31, meanwhile the first button 20 moves toward the outside of the circuit breaker.

The basic processes of the circuit breaker normally switching on, normally switching off and switching off with fault in the present invention are shown as follows.

Figure 10A:
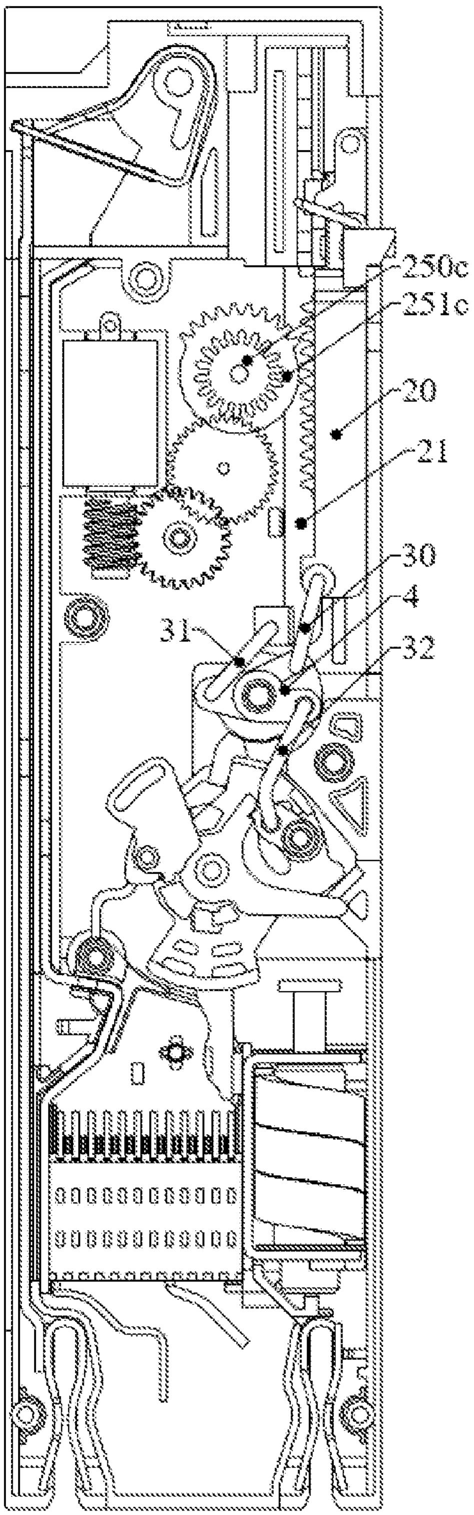
FIG. 10A is a structure diagram of the third embodiment of the circuit breaker of the present invention, where the circuit breaker is in the switch-off state.
Figure 10B:
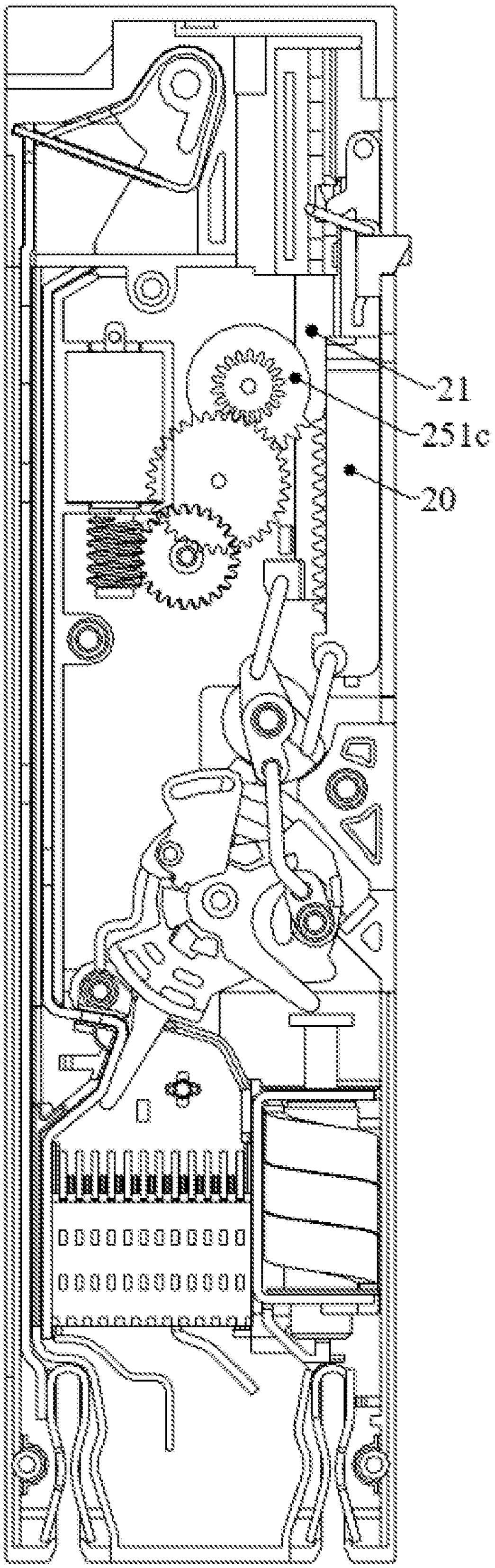
FIG. 10B is a structure diagram of the third embodiment of the circuit breaker of the present invention, where the circuit breaker is in the switch-on state.

As shown in FIG. 10A, the circuit breaker is in the switch-off state. During the switch-on operation, pressing down the first button 20 enables the first button 20 to drive the transmission member 4 to rotate clockwise through the first connecting rod 30, and the transmission member 4 drives lever mechanism to rotate clockwise in its entirety through the transmission connecting rod 32; thus the lever mechanism drives the movable contact 60 to sway clockwise to join the movable contact 60 to the static contact 61, the circuit breaker finishes switching on (as shown in FIG. 10B), meanwhile the second button 21 moves toward the outside of the circuit breaker. As shown in FIG. 10B, the circuit breaker is in the switch-on state. During the switch-off operation, pressing down the second button 21 enables the second button 21 to drive the transmission member 4 to rotate counterclockwise through the second connecting rod 31, the transmission member 4 drives the jump buckle 50 and the lock catch 51 to release the locking co-operation between them through the transmission connecting rod 32, the rotating plate 52 drives the movable contact 60 to sway counterclockwise to separate the movable contact 60 from the static contact 61, the circuit breaker finishes switching off (as shown in FIG. 10A), meanwhile the first button 20 moves toward the outside of the circuit breaker.

When a short-circuit or overload fault occurs in the circuit breaker, the short-circuit protection mechanism 7 or the overload protection mechanism 9 drives the lock catch 51 to rotate counterclockwise, so that the jump buckle 50 and the lock catch 51 are released from each other; the rotating plate 52 drives the movable contact 60 to sway counterclockwise, to separate the movable contact 60 from the static contact 61, so that the circuit breaker switches off (as shown in FIG. 10A).

Figure 6:
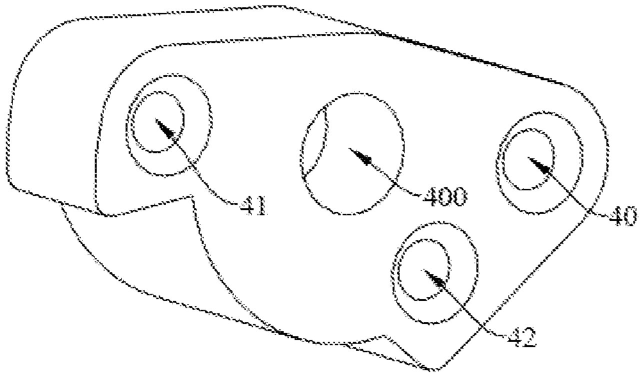
FIG. 6 is a structure diagram of the transmission member of the present invention.

Preferably, as shown in FIG. 6, an embodiment of the transmission member 4 is provided.

As shown in FIG. 6, the transmission member 4 includes the transmission member axle hole 400 arranged in the middle thereof, and the first connection hole 40, the second connection hole 41, and the third connection hole 42 all arranged around the transmission member axle hole 400. The first connection hole 41, the second connection hole 41 and the third connection hole 42 are positioned at three vertices of a triangle thereon, respectively. The second connection hole 41 is arranged at one end of the transmission member 4, and the first connection hole 40 and the third connection hole 42 are arranged at the other end of the transmission member 4. Specifically, in the directions shown in FIG. 6, The transmission member axle hole 400 is arranged in the middle of the transmission member 4, the second connection hole 41 is arranged at the left end of the transmission member 4 and positioned on the left side of the transmission member axle hole 400, and the first connection hole 40 and the third connection hole 42 are arranged at the right end of the transmission member 4 and positioned on the right side of the transmission member axle hole 400.

Figure 13A:
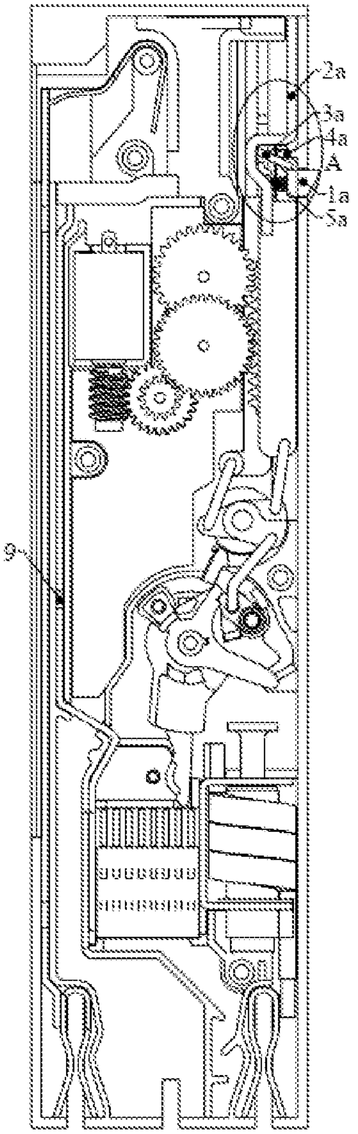
FIG. 13A is a structure diagram of the circuit breaker of the present invention, showing the cooperation relation between the first locking member and the unlocking mechanism.
Figure 13B:
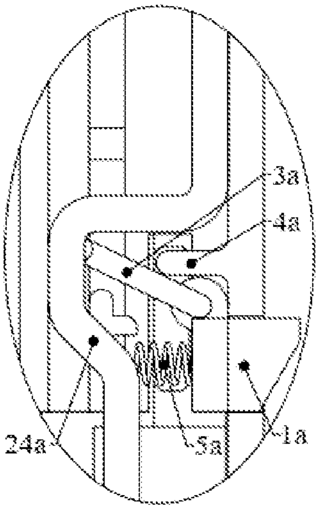
FIG. 13B is an enlarged structure diagram at A in FIG. 13A of the present invention.

Preferably, as shown in FIGS. 13A-13B, the circuit breaker of the present invention further includes the first locking member 1*a* with one end protruding outside the circuit breaker housing 1; the circuit breaker housing 1 includes the locking member opening co-operated with the first locking member 1*a*, and the first resetting spring 5*a* drives one end of the first locking member 1*a* to protrude outside the circuit breaker housing 1 through the locking member opening; when the circuit breaker is in the switch-off state, the first locking member 1*a* can retract into the inside of the circuit breaker housing 1 under the function of an external force for retraction, and after retracting into the inside of the circuit breaker housing 1, the first locking member 1*a* can be co-operated with the first button 20 and/or the second button 21 in a position-limit way and enables the circuit breaker not to switch on; when the circuit breaker is in the switch-on state, the first locking member 1*a* protrudes outside the circuit breaker housing 1, and the first locking member 1*a* is limited by the first button 20 and/or the second button 21 in a position-limit way and cannot retract into the circuit breaker housing 1. For example, while the circuit breaker is being installed to the assembling position for the circuit breaker in the switch-off state, the assembling position housing for the circuit breaker squeezes the first locking member 1*a* to enable it move toward the inside of the circuit breaker housing 1 (the assembling position housing applies a external force for retraction on the first locking member 1*a*) during this assembling process, so as to enable the first locking member 1*a* to be co-operated with the first button 20 and/or the second button 21 in a position-limit way, and lock the first button 20 and/or the second button 21; after the circuit breaker has been assembled to the designated position, the locking member opening corresponds to the assembling limiting hole of the assembling position housing, so the first locking member 1*a* protrudes outside the circuit breaker housing 1 again and releases its position-limiting co-operation with the first button 20 and/or the second button 21, and the first button 20 and/or the second button 21 being unlocked and co-operating the first locking member 1*a* with the assembling position housing in a position-limit way enable the circuit breaker to normally switch on and switch off through the first button 20 and/or the second button 21, and prevent the circuit breaker from being pulled out from its assembling position at will.

Further, as shown in FIGS. 13A-13B, the circuit breaker further includes an unlocking mechanism, and the unlocking mechanism includes the independent pulling member 2*a* arranged inside the circuit breaker housing 1 and drivingly co-operated with the first locking member 1*a*; when the circuit breaker is in the switch-off state, the pulling member 2*a* is pulled out of the circuit breaker housing 1, thus the pulling member 2*a* drives the first locking member to move toward the inside of the circuit breaker housing 1 against the elastic force of the first resetting spring 5*a*, retract into the inside of the circuit breaker housing, release its position-limiting co-operation with the assembling position housing, and co-operate with the first button 20 and/or the second button 21 in a position-limit way; at this time, further pulling the pulling member 2*a* enables the circuit breaker to be pulled out from the assembling position of the circuit breaker. When the circuit breaker is in the switch-on state, the first button 20 and/or the second button 21 prevent the first locking member 1*a* from moving toward the inside of the circuit breaker housing 1, and at this time, the first locking member 1*a* cannot retract into the inside of the circuit breaker the housing 1 through the unlocking mechanism. Further, as shown in FIGS. 13A-13B, the unlocking mechanism further includes the linkage member 3*a* and the lever support 4*a* arranged on the circuit breaker housing 1; of the linkage member 3*a*, one end is drivingly connected with the first locking member 1*a*, the other end is drivingly co-operated with the pulling member 2*a*, and the middle part is contacting co-operated with the lever support 4*a*; the pulling member 2*a* is pulled toward the outside of the circuit breaker housing 1, thus the pulling member 2*a* drives the linkage member 3*a* to rotate around the lever support 4*a*, and the linkage member 3*a* drives the first locking member 1*a* to move toward the inside of the circuit breaker housing 1 and release its position-limiting co-operation with the assembling position housing. Further, as shown in FIG. 13A, the pulling member 2*a* is placed on one side of the button mechanism 2 in overlap in the thickness direction of the circuit breaker housing 1, helping to improve the compactness of the circuit breaker structure. Further, as shown in FIGS. 13A and 13B, the movement direction of the pulling member 2 is parallel to the movement direction of the first button 20 and the second button 21, and perpendicular to the movement direction of the first locking member 1*a*.

Preferably, the first button 20 and/or the second button 21 is provided with a locking member limiting groove, and the first locking member 1*a* is provided with a locking member limiting protrusion; when the circuit breaker switches on, the movement of the first button 20 and the second button 21 enables the locking member limiting groove to be misaligned with the locking member limiting protrusion, and the locking member limiting protrusion cannot slide into the locking member limiting groove; when the circuit breaker switches off, the movement of the first button 20 and the second button 21 causes the locking member limiting groove and the locking member limiting protrusion to be opposite to each other, and the pulling member 2 is pulled to drive the first locking member 1*a* to move toward the inside of the circuit breaker housing 1, so as to enable the locking member limiting protrusion to slide into the locking member limiting groove, and the first locking member 1*a* to lock the first button 20 and/or or the second button 21, so that the circuit breaker cannot switch on.

As shown in FIGS. 1-8B, the first embodiment of the circuit breaker of the present invention is provided.

As shown in FIGS. 1, 7A-8B, the button mechanism 2 of the circuit breaker of this embodiment includes the first button 20 and the second button 21; the electric mechanism 2*c* includes the driving motor 20*c*, the transmission gear set and the transmission rack 26*c*; the driving motor 20*c* is drivingly co-operated with the transmission rack 26*c* through the transmission gear set, and the transmission rack

Figure 4:
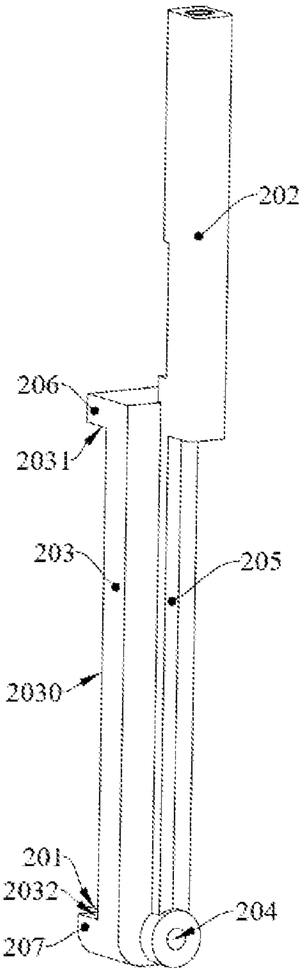
FIG. 4 is a structure diagram of the first button of the present invention.

26*c* is drivingly co-operated with the first button 20. Further, as shown in FIG. 4, the first button 20 includes the rack limiting groove 2030 arranged on one side thereof, the transmission rack 26*c* is arranged in the rack limiting groove 2030, and the rack limiting groove 2030 includes the switch-on side surface 2032 and the switch-off side surface 2031 respectively arranged at both ends thereof; the driving motor 20*c* drives the transmission rack 26*c* to slide in the rack limiting groove 2030, and drives the first button 20 through the switch-on side surface 2032 and the switch-off side surface 2031 to enable the circuit breaker to switch on/switch off; when the circuit breaker switches on, the transmission rack 26*c* moves from the first initial position toward the switch-on side surface 2032 till the transmission rack 26*c* contacts with the latter, then the transmission rack 26*c* continues to move and drives the first button 20 to move toward the inside of the circuit breaker housing 1 through the switch-on side surface 2032; after the circuit breaker has switched on, the transmission rack 26*c* returns back to the first initial position; when the circuit breaker switches off, the transmission rack 26*c* moves toward the switch-off side surface 2031 to contact with the latter, then the transmission rack 26*c* continues to move and drives the first button 20 to move toward the outside of the circuit breaker housing 1 through the switch-off side surface 2031; after the circuit breaker has switched off, the transmission rack 26*c* returns back to the first initial position. In the circuit breaker of the present invention, the electric mechanism 2*c* performs the switch-on/switch-off operation through the cooperation of the transmission rack 26*c* and the button mechanism, and after completing the switch-on/switch-off operation, the electric mechanism 2*c* continues to drive the transmission rack 26*c* to return back to the first initial position without interference with the first button 20. Firstly, users can still manually perform the switch-on/switch-off operation on the circuit breaker; secondly, when the circuit breaker trips off due to a short circuit or overload fault, the transmission rack 26*c* will not affect the operation of the operating mechanism, ensuring the protection performance of the circuit breaker. It should be pointed out that the transmission rack 26*c* is not limited to co-operate with the first button 20, as wells as cooperates with the second button 21, and the rack limiting groove 2030 is arranged on one side of the second button 21. Thus, when the circuit breaker switches on/switches off, the movement direction of the transmission rack 26*c* is opposite to that of the transmission rack 26*c* in the first embodiment.

We shall further describe the switch-on/switch-off process of the circuit breaker in this embodiment with reference to FIGS. 1-2 and 7A-8B as follows.

Figure 2:
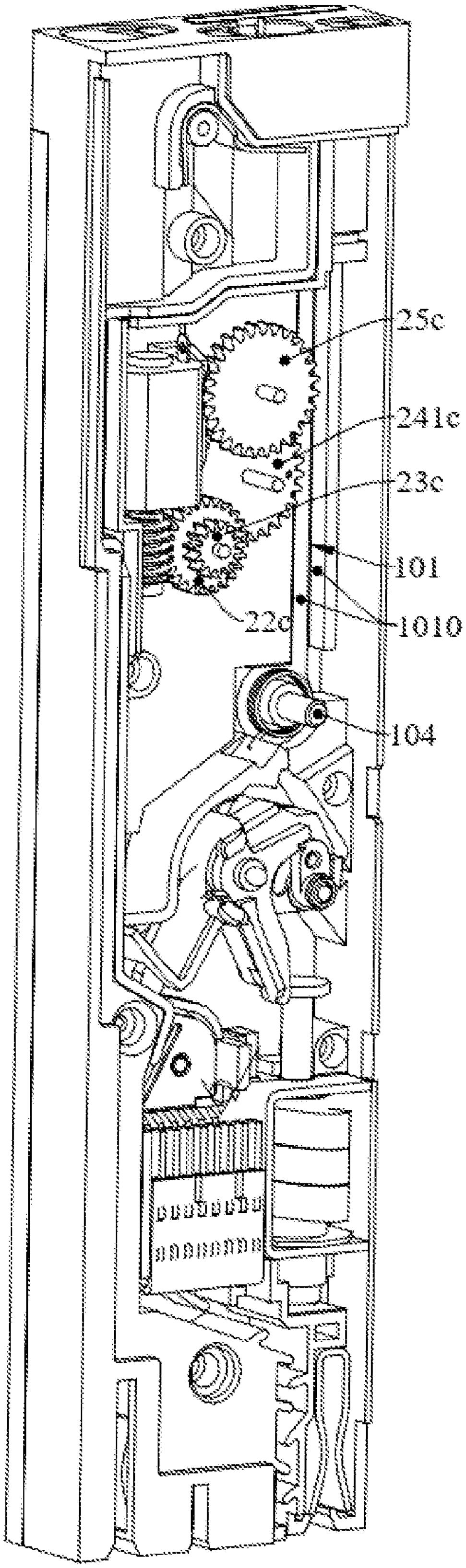
FIG. 2 is a structure diagram of the first embodiment of the circuit breaker of the present invention, at least showing the structure of the track groove.
Figure 7A:
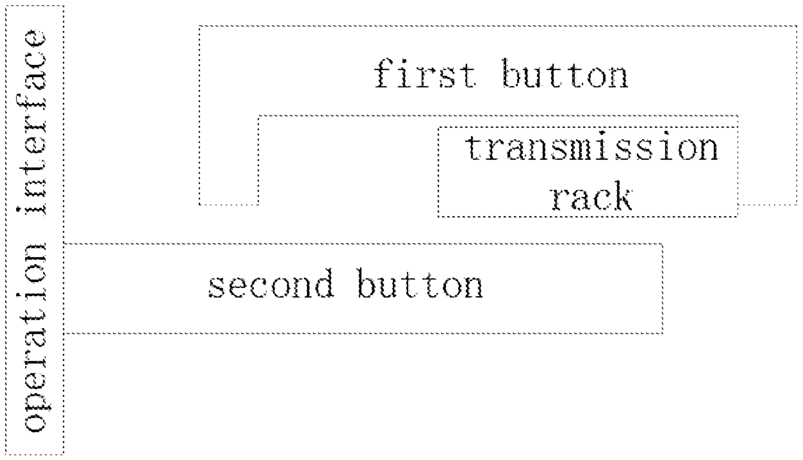
FIG. 7A is a schematic diagram of the principle that the circuit breaker switches on in the first embodiment of the circuit breaker of the present invention.
Figure 7B:
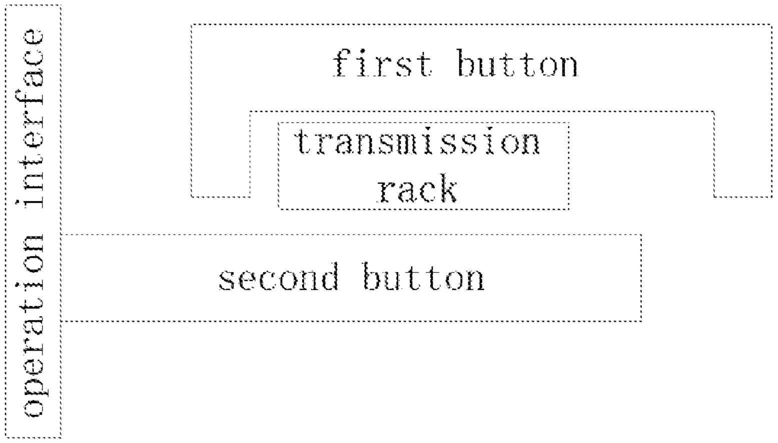
FIG. 7B is a schematic diagram of the transmission rack reset after the circuit breaker of the present invention has switched on in the first embodiment.
Figure 8A:
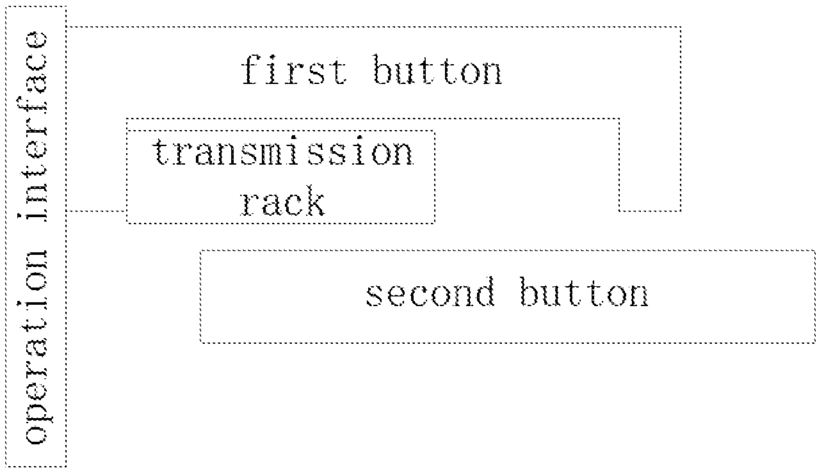
FIG. 8A is a schematic diagram of the principle that the circuit breaker switches off in the first embodiment of the circuit breaker of the present invention.
Figure 8B:
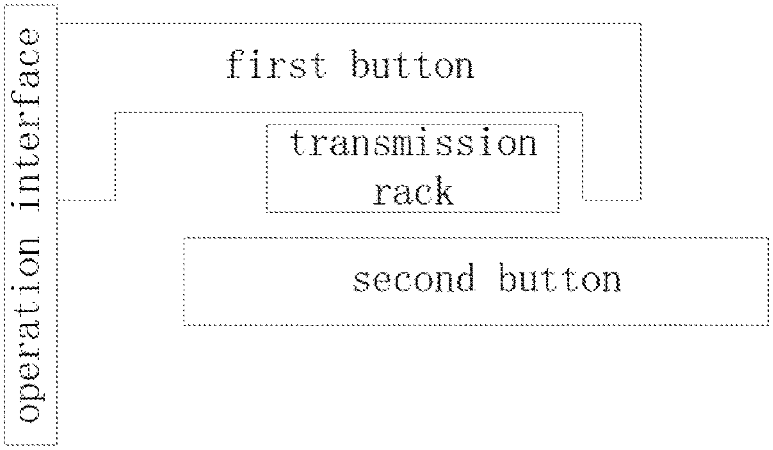
FIG. 8B is a schematic diagram of the transmission rack reset after the circuit breaker of the present invention has broken contact in the first embodiment.

As shown in FIGS. 1 and 2, the upper side wall of the circuit breaker housing 1 serves as the operation interface; as shown in FIGS. 7A-8B, of the first button 20, moving toward the operation interface corresponds to moving toward the outside of the circuit breaker housing 1, and moving away from the operation interface corresponds to moving toward the inside of the circuit breaker housing 1; Specifically, as shown in FIG. 8B, while the circuit breaker is in the switch-off state, the transmission rack 26*c* is at the first initial position, and the driving motor 20*c* drives the transmission rack 26*c* to move rightwards to contact with the switch-on side surface 2032 of the rack limiting groove 2030, thus the transmission rack 26*c* is driven to continue to move rightwards and drives the first button 20 to move rightwards through the switch-on side surface 2032; as shown in FIG. 7A, the circuit breaker completes switching on, and the transmission rack 26*c* is driven to move leftwards to the first initial position (as shown in FIG. 7B); as shown in FIG. 7B, while the circuit breaker is in the switch-on state, the transmission rack 26*c* is at the first initial position, and the driving motor 20*c* drives the transmission rack 26*c* to move leftwards to contact with the switch-off side surface 2032 of the rack limiting groove 2030; as shown in FIG. 8A, the transmission rack 26*c* is driven to continue to move leftwards and drives the first button 20 to move leftwards through the switch-off side surface 2032; as shown in FIG. 8B, the circuit breaker completes switching off, and the transmission rack 26*c* is driven to move rightwards to the first initial position.

Figure 3:
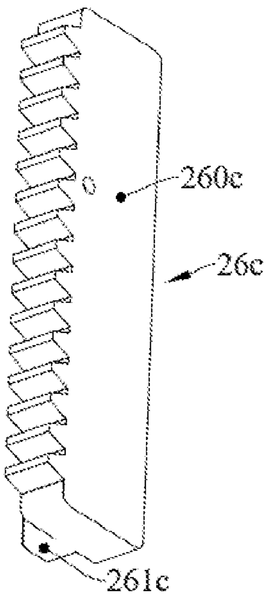
FIG. 3 is a structure diagram of the transmission rack of the present invention.
Figure 5:
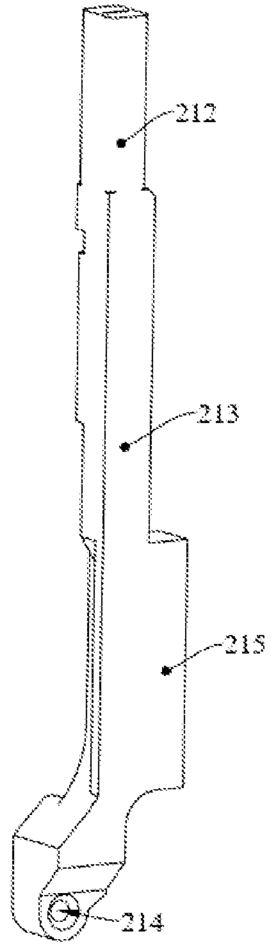
FIG. 5 is a structure diagram of the second button of the present invention.

Preferably, as shown in FIGS. 2-4, the circuit breaker housing 1 includes the first button hole, the second button hole and the track groove 101 all arranged thereon. One end of the first button 20 is slidably arranged in the first button hole, and one end of the second button 21 is slidably arranged in the second button hole. The first button 20 includes the first button's track protrusion 201 arranged at the other end thereof, and the first button's track protrusion 201 is slidably arranged in the track groove 101; the transmission rack 26*c* includes the rack track bar 261*c* arranged on one side thereof, and the rack track bar 261*c* is slidably arranged in the rail groove 101. Further, as shown in FIG. 2, the circuit breaker housing 1 includes the first rib 1010, and the track groove 101 is arranged in the middle of the first rib 1010 and extends in the length direction of the first rib 1010. Further, as shown in FIG. 4, the first button 20 further includes the second button's track bar 205 arranged thereon and extending in the length direction of the first button 20. As shown in FIG. 5, the second button 21 includes the second button's track portion 215, and one side of the second button's track portion 215 facing the first button 20 is provided with the second button's track groove. The second button's track groove is slidably co-operated with the second button's track bar 205.

Specifically, as shown in FIG. 1, the side of FIG. 1 facing the reader serves as the front side of the circuit breaker; the first rib 1010 is arranged on the bottom plate of the circuit breaker housing 1, and the first button hole is arranged on the upper side wall of the circuit breaker housing; of the first button 21, the upper end of is slidably arranged in the first button hole, and the first button rail protrusion 201 of the lower end is slidably arranged in the track groove 101. The arrangements of the transmission rack 26*c* on the front side of the first rib 1010, the first button 21 on the front side of the transmission rack 26*c*, and the second button's track portion 215 on the front side of the first button 21 form the reliable position-limiting co-operation of the transmission rack 26*c* with the track groove 101, the first button 20 with the track groove 101, the first button 20 with the transmission rack 26*c*, and the second button 21 with the first button 20, ensuring the operational reliability of the operating mechanism.

Preferably, as shown in FIG. 1, the transmission gear set includes the worm wheel 21*c* drivingly connected to the driving motor 20*c*, the first transmission gear 22*c* meshing with the worm wheel 21*c*, the second transmission gear 23*c* is coaxial linkage with the first transmission gear 22*c*, the third upper transmission gear 240*c* meshing with the second transmission gear 23*c*, the third lower transmission gear 241*c* is coaxial linkage with the third upper transmission gear 240*c*, and the driving gear 25*c* meshing with the third lower transmission gear 241*c*. The driving gear 25*c* meshes with the transmission rack 26*c*. It should be pointed out that the transmission gear set may increase or decrease as required.

Preferably, as shown in FIG. 3, an embodiment of the transmission rack 26*c* is provided.

The transmission rack 26*c* in a strip-shape is slidably arranged inside the circuit breaker housing 1, including the transmission rack block 260*c*, the rack arranged on one side of the transmission rack block 260*c* and co-operated with the transmission gear set, and rack track bar 261*c* arranged on another side of the transmission rack block 260*c*. Preferably, the sliding direction of the transmission rack 26*c* is parallel to the first button 20 and the second button 21, and the transmission rack 26*c* is arranged between the first button 20 and the second button 21.

Preferably, as shown in FIG. 4, an embodiment of the first button 20 is provided. The first button 20 includes the first button operating portion 202, the first button's transmission portion 203 and the second button's track bar 205. Of the first button operating portion 202, one end is the first button operating end, and the other end is connected to one end of the first button's transmission portion 203 in overlap, the other end of which is provided with the first button connecting hole 204 and the first button's track protrusion 201; the second button's track bar 205 is arranged on one side of the first button's transmission portion 203, and the second button's track bar 205 and the first button operating portion 202 are positioned on the same side of the first button's transmission portion 203; the first button connecting hole 204 is connected to one end of the first connecting rod 30 of the operating mechanism, and the first button's track ridge 201 is slidably arranged in the track groove 101 of the circuit breaker housing 1. Further, as shown in FIG. 4, the first button 20 further includes the rack limiting groove 2030 arranged on one side of the first button's transmission portion 203, and the rack limiting groove 2030 and the second button's track bar 205 are positioned on the both sides of the first button's transmission portion 203 respectively. Further, as shown in FIG. 4, the first button's transmission portion 203 further includes the switch-on side wall 207 and the switch-off side wall 206 arranged at the both ends of the rack limiting groove 2030; the inner side of switch-on side wall 207 is the switch-on side surface 2032, the inner side of the switch-off side wall 206 is the switch-off side surface 2031; the first button's track ridge 201 is arranged at one end of the switch-on side wall 207.

Preferably, as shown in FIG. 5, an embodiment of the second button 21 is provided.

The second button 21 includes the second button operating portion 212, the second button's transmission portion 213, the second button's track portion 215 and the second button connecting hole 214; of the second button operating portion 211, one end is the second button operating end, and the other end is connected to one end of the second button's transmission portion 213, the other end of which is provided with the second button connecting hole 214; the second button's track portion 215 is arranged on the side of the second button's transmission portion 213, and the side of the second button's track portion 215 facing the first button's transmission portion 203 is provided with the second button's track groove slidingly co-operated with the second button's track bar 205. Specifically, in the directions shown in FIG. 5, the second button's track portion 215 is arranged on the right side of the second button's transmission portion 213.

Preferably, the first button 20 and the second button 21 are positioned inside the first button hole and the second button hole during the switch-on and switch-off operation, respectively, and do not protrude from the circuit breaker housing 1, so as to avoid accidental touch.

As shown in FIG. 9, the second embodiment of the circuit breaker of the present invention is provided.

This embodiment is different from the first embodiment in that: the button mechanism 2 only includes the first button 20, and one end of the first button 20 protrudes outside the circuit breaker housing 1, enabling the switch-on operation and switch-off operation by pressing and pulling respectively; the connecting rod structure 33 only includes the first connecting rod 30, through which the first button 20 is drivingly connected to the transmission member 4.

Specifically, as shown in FIG. 9, of the first button 20, the upper end protrudes outside the circuit breaker housing 1, and the lower end is drivingly connected to the transmission member 4 through the first connecting rod 30. The electric mechanism 2*c* is co-operated with the first button 20 through the transmission rack 26*c*, so as to enable the switch-on operation and switch-off operation.

As shown in FIGS. 10A and 10B, the third embodiment of the circuit breaker of the present invention is provided.

This embodiment is different from the first embodiment in that: the first button 20 and the transmission rack 26*c* are fixedly connected to each other, or the first button 20 and the transmission rack 26*c* are integrally shaped; the transmission gear set includes the first fan-shaped gear 251*c* drivingly engaged with the transmission rack 26*c*; when the circuit breaker switches on, the first fan-shaped gear 251*c* rotates in the first direction and drives the first button 20 to move toward the inside of the circuit breaker housing 1 through the transmission rack 26*c*, thus the circuit breaker switches on and the first fan-shaped gear 251*c* rotates to its disengagement from the transmission rack 26*c*; when the circuit breaker switches off, the first fan-shaped gear 251*c* rotates in the second direction and drives the first button 20 to move toward the outside of the circuit breaker housing 1 through the transmission rack 26*c*, thus the circuit breaker switches off and the first fan-shaped gear 251*c* rotates to its disengagement from the transmission rack 26*c*. In the circuit breaker of the present invention, the first fan-shaped gear 250*c* drives the operating mechanism through the transmission rack 26*c*, so that after ending the switch-on/switch-off operation on the circuit breaker the first fan-shaped gear 251*c* rotates to its disengagement from the transmission rack 26*c*, thereby bringing out no interference with the first button 20. Firstly, users can still manually perform the switch-on/switch-off operation on the circuit breaker; secondly, when the circuit breaker trips off due to a short circuit or overload fault, the first fan-shaped gear 251*c* will not affect the operation of the operating mechanism, ensuring the protection performance of the circuit breaker.

Specifically, as shown in FIG. 10A, the circuit breaker is in the switch-off state, the first fan-shaped gear 251*c* is disengaged from the transmission rack 26*c*, the driving motor 20*c* drives the first fan-shaped gear 251*c* to rotate clockwise, then the first fan-shaped gear 251*c* rotates to its engagement with the transmission rack 26*c* and continues to rotate, driving the first button 20 to move downwards by the transmission rack 26*c*, as shown in FIG. 10B, after the circuit breaker switches on, the first fan-shaped gear 251*c* continues to rotate to its disengagement from the transmission rack 26*c*; as shown in FIG. 10B, the circuit breaker is in the switch-on state, the first fan-shaped gear 251*c* is disengaged from the transmission rack 26*c*, the driving motor 20*c* drives the first fan-shaped gear 251*c* to rotate counterclockwise, then the first fan-shaped gear 251*c* rotates to its engagement with the transmission rack 26*c* and continues to rotate, driving the first button 20 to move upwards by the transmission rack 26*c*, as shown in FIG.

10A, after the circuit breaker switches off, the first fan-shaped gear 251*c* continues to rotate to its disengagement from the transmission rack 26*c*.

Preferably, as shown in FIG. 10A, the transmission gear set of this embodiment is different from that of the first embodiment in that: the driving gear 25*c* includes the first fan-shaped gear 251*c* and the fourth transmission gear 250*c* is coaxial linkage with each other, and the fourth transmission gear 250*c* meshes with the third transmission gear 24*c*.

Figure 11A:
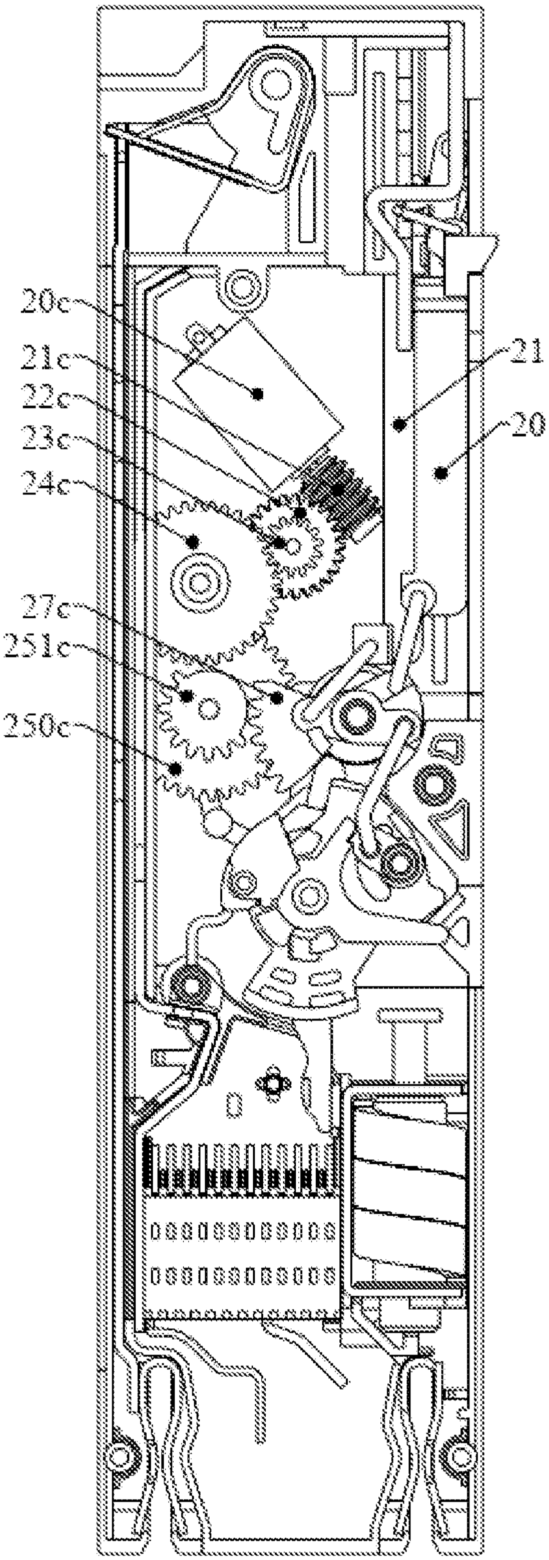
FIG. 11A is a structure diagram of the fourth embodiment of the circuit breaker of the present invention, where the circuit breaker is in the switch-off state.
Figure 11B:
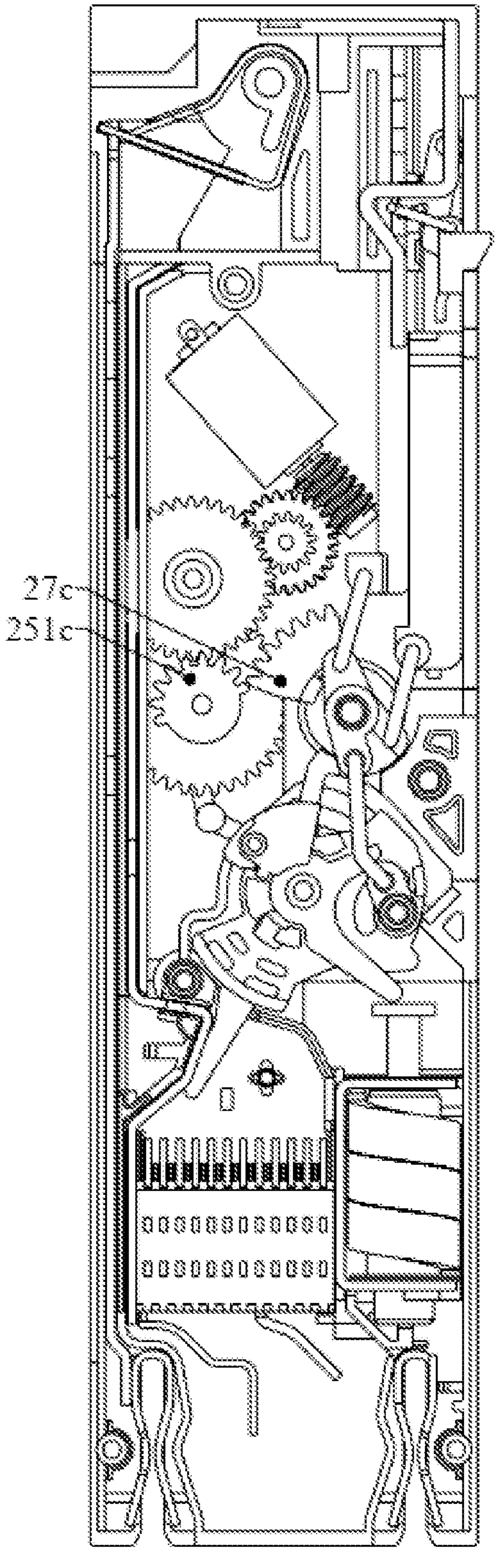
FIG. 11B is a structure diagram of the fourth embodiment of the circuit breaker of the present invention, where the circuit breaker is in the switch-on state.

As shown in FIGS. 11A and 11B, the fourth embodiment of the circuit breaker of the present invention is provided.

This embodiment is different from the first embodiment in that: the electric mechanism 2*c* enables the circuit breaker to electrically switch on and switch off by driving the transmission member 4 of the operating mechanism for remote control. The electric mechanism 2*c* includes the driving motor 20*c*, the transmission gear set, and the transmission member's gear 27*c* coaxially arranged with the transmission member 4. The transmission gear set includes the switch-on and switch-off driving gear drivingly co-operated with the transmission member's gear 27*c*, the switch-on and switch-off driving gear drives the transmission member's gear 27*c* to rotate, and the transmission member's gear 27*c* drives the transmission member 4 to rotate, enabling the circuit breaker to switch on/switch off.

Preferably, the transmission member 4 and the transmission member's gear 27*c* coaxially interact with each other, and the switch-on and switch-off driving gear is the first fan-shaped gear 251*c*; when the circuit breaker switches on, the first fan-shaped gear 251*c* rotates in the second direction to its engagement with the transmission member's gear 27*c* and drives the transmission member's gear 27*c* to rotate in the first direction, thus the transmission member's gear 27*c* drives the transmission member 4 to rotate in the first direction, the circuit breaker switches on and the first fan-shaped gear 251*c* rotates to disengagement from the transmission member's gear 27*c*; when the circuit breaker switches off, the first fan-shaped gear 251*c* rotates in the first direction to its engagement with the transmission member's gear 27*c* and drives the transmission member's gear 27*c* to rotate in the second direction, thus the transmission member's gear 27*c* drives the transmission member 4 to rotate in the second direction, the circuit breaker switches off and the first fan-shaped gear 251*c* rotates to its disengagement from the transmission member's gear 27*c*. In the circuit breaker of the present invention, the first fan-shaped gear 251*c* drives the operating mechanism through the transmission member's gear 27*c*, so that ending the switch-on and switch-off operation on the circuit breaker, the first fan-shaped gear 251*c* rotates to its disengagement from the transmission member's gear 27*c*, thereby bringing out no interference with the transmission member's gear 27*c* (and the transmission member 4 interacting with the transmission member's gear 27*c*). Firstly, users can still manually perform the switch-on/switch-off operation on the circuit breaker; secondly, when the circuit breaker trips off due to a short circuit or overload fault, the first fan-shaped gear 251*c* will not affect the operation of the operating mechanism, ensuring the protection performance of the circuit breaker. Further, as shown in FIGS. 11A and 11B, the transmission member's gear 27*c* is a fan-shaped gear.

Specifically, as shown in FIG. 11A, the circuit breaker is in the switch-off state, the first fan-shaped gear 251*c* is disengaged from the transmission member's gear 27*c*; when the circuit breaker switches on, the driving motor 20*c* drives the first fan-shaped gear 251*c* to rotate counterclockwise to its engagement with the transmission member's gear 27*c*, then the first fan-shaped gear 251*c* is driven to continue to rotate and drives the transmission member's gear 27*c* to rotate clockwise, and the transmission member's gear 27*c* drives the transmission member 4 to rotate clockwise, as shown in FIG. 11B, the circuit breaker has switched on and the first fan-shaped gear 251*c* is driven to continue to rotate to its disengagement from the transmission member's gear 27*c*; as shown in FIG. 11B, the circuit breaker is in the switch-on state, the first fan-shaped gear 251*c* is disengaged from the transmission member's gear 27*c*, when the circuit breaker switches on, the driving motor 20*c* drives the first fan-shaped gear 251*c* to rotate clockwise to its engagement with the transmission member's gear 27*c*, then the first fan-shaped gear 251*c* is driven to continue to rotate and drives the transmission member's gear 27*c* to rotate counterclockwise, and the transmission member's gear 27*c* drives the transmission member 4 to rotate counterclockwise, as shown in FIG. 11A, the circuit breaker has broken contact, and the first fan-shaped gear 251*c* is driven to continue to rotate to its disengagement from the transmission member's gear 27*c*.

Preferably, this embodiment is the same with the third embodiment in the aspect of the transmission gear set, but different in that each gear has different positional relationship and size from each other, and the number of gears is adjustable.

Figure 15A:
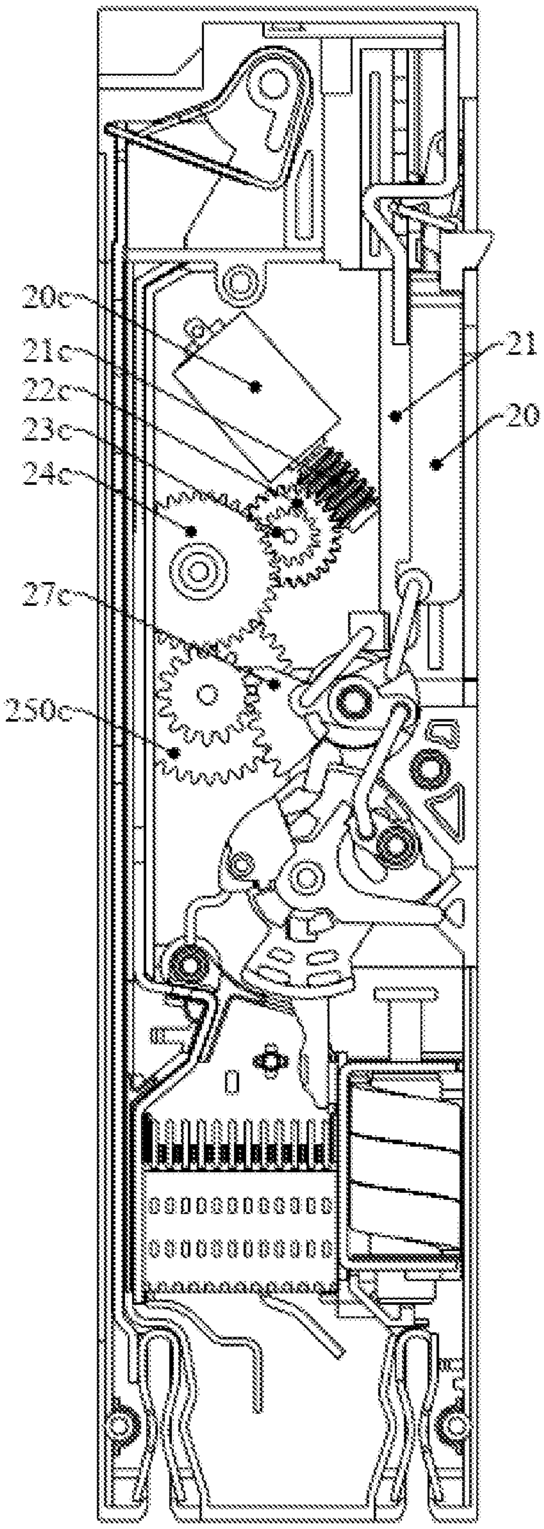
FIG. 15A is a structure diagram of the fifth embodiment of the circuit breaker of the present invention, where the circuit breaker is in the switch-off state.
Figure 15B:
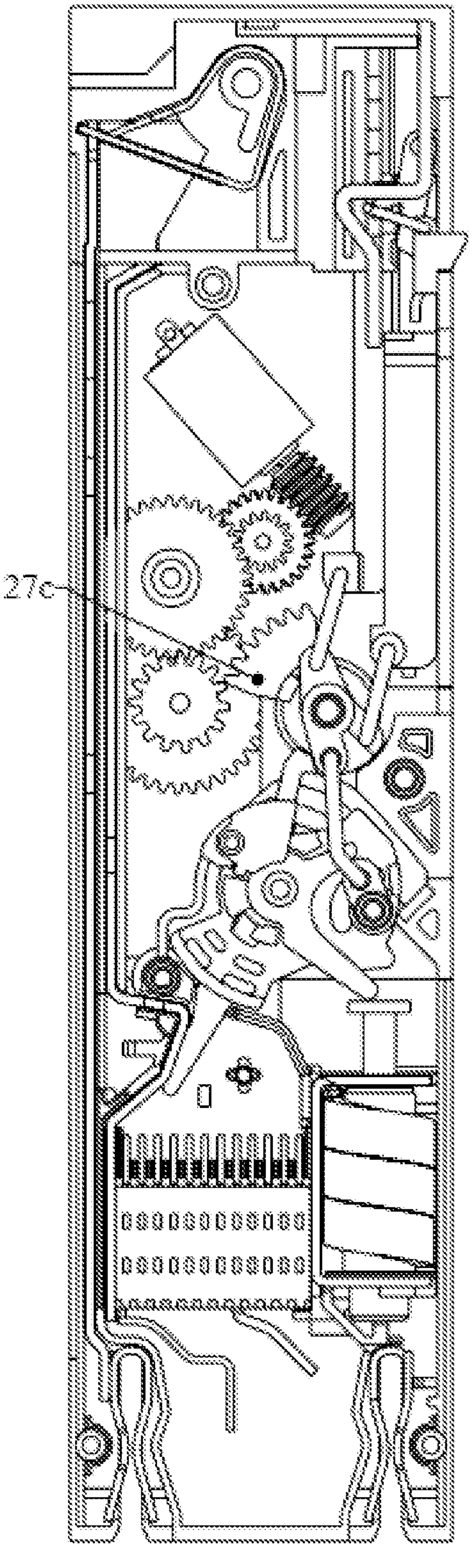
FIG. 15B is a structure diagram of the fifth embodiment of the circuit breaker of the present invention, where the circuit breaker is at the conversion form the switch-off state to the switch-on state.
Figure 15C:
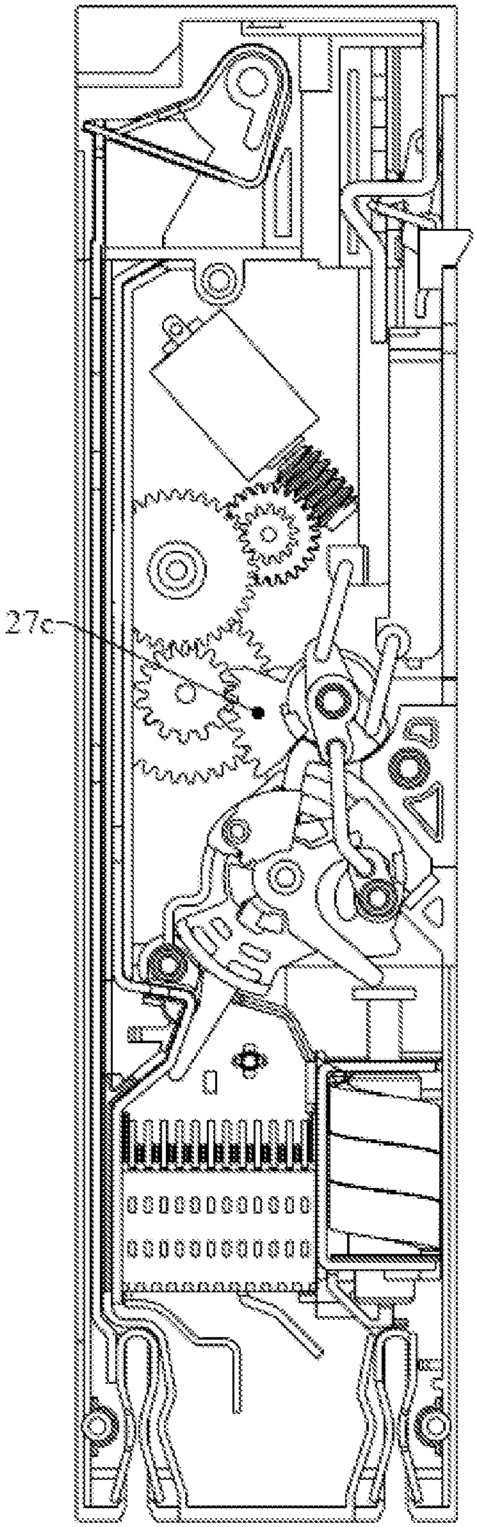
FIG. 15C is a structure diagram of the fifth embodiment of the circuit breaker of the present invention, where the circuit breaker is in the switch-on state.

As shown in FIGS. 15A-15C, the fifth embodiment of the circuit breaker of the present invention is provided.

This embodiment is different from the fourth embodiment in that: the transmission member's gear 27*c* and the transmission member 4 are coaxially arranged, and there is an idle stroke therebetween.

When the circuit breaker switches on, the switch-on and switch-off driving gear rotates in the second direction and drives the transmission member's gear 27*c* to rotate from the second initial position to the first direction to its position-limiting co-operation with the transmission member 4; the transmission member's gear 27*c* drives the transmission member 4 to rotate in the first direction, thus the circuit breaker switches on and the switch-on and switch-off driving gear rotates in the first direction, so as to drive the transmission member's gear 27*c* to rotate back to the second initial position; when the circuit breaker switches off, the switch-on and switch-off driving gear rotates in the first direction and drives the transmission member's gear 27*c* to rotate from the second initial position to the second direction to its position-limiting co-operation with the transmission member 4, the transmission member's gear 27*c* drives the transmission member 4 to rotate in the second direction, thus the circuit breaker switches off and the switch-on and switch-off driving gear rotates in the second direction, so as to drive the transmission member's gear 27*c* to rotate back to the second initial position. Further, the switch-on and switch-off driving gear is the first fan-shaped gear 251*c* or a full-shaped gear.

Specifically, as shown in FIG. 15A, the circuit breaker is in the switch-off state, when the circuit breaker switches on, the driving motor 20*c* drives the switch-on and switch-off driving gear to rotate counterclockwise, thus the switch-on and switch-off driving gear drives the transmission member's gear 27*c* to rotate clockwise from the second initial position to its position-limiting co-operation with the transmission member 4, and the transmission member's gear 27*c* continues to rotate and drives the transmission member 4 to rotate clockwise, so that the circuit breaker completes switching on as shown in FIG. 15B, as shown in FIG. 15C, the switch-on and switch-off driving gear is driven to rotate clockwise and drives the transmission member's gear 27*c* to rotate counterclockwise back to the second initial position. As shown in FIG. 15C, the circuit breaker is in the switch-on state, when the circuit breaker switches off, the driving motor 20*c* drives the switch-on and switch-off driving gear to rotate clockwise, thus the switch-on and switch-off driving gear drives the transmission member's gear 27*c* to rotate counterclockwise to its position-limiting co-operation with the transmission member 4, and the transmission member's gear 27*c* continues to rotate and drives the transmission member 4 to rotate counterclockwise, so that the circuit breaker completes switching off, as shown in FIG. 15A, the switch-on and switch-off driving gear is driven to rotate counterclockwise and drives the transmission member's gear 27*c* to rotate back to the second initial position.

The circuit breaker of the present invention has an idle stroke between the transmission member's gear 27*c* and the transmission member 4 (that is, only after rotating with a certain angle, the transmission member's gear 27*c* can drive the transmission member 4 to synchronously rotate, before the transmission member 4 starts to rotate, the transmission member's gear 27*c* has rotated with the angle as an idle stroke), therefore, after the operating mechanism actuates the circuit breaker to switch on and switch off through the electric mechanism 2*c*, the transmission member's gear 27*c* rotates back to the second initial position, thereby bringing out no interference with the transmission member 4; firstly, users can still manually perform the switch-on/switch-off operation on the circuit breaker; secondly, when a short circuit or overload fault occurs, the circuit breaker can successfully trips off, ensuring the protection performance of the circuit breaker.

Figure 12A:
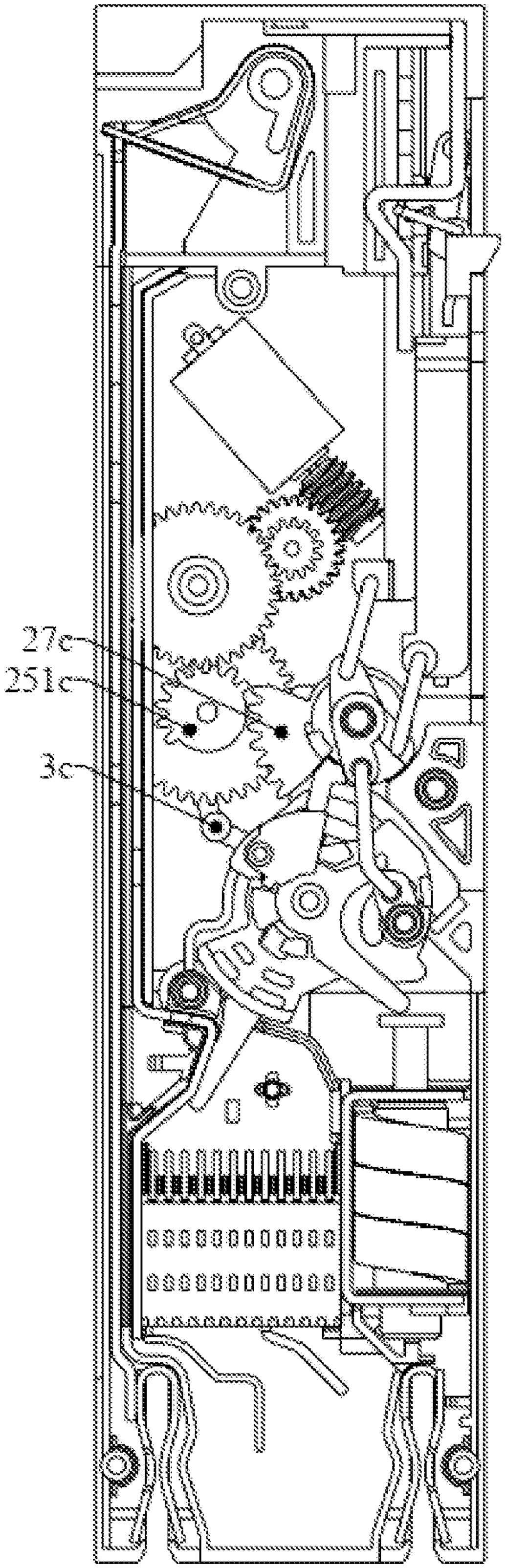
FIG. 12A is a structure diagram of the sixth embodiment of the circuit breaker of the present invention, where the circuit breaker is in the switch-on state.
Figure 12B:
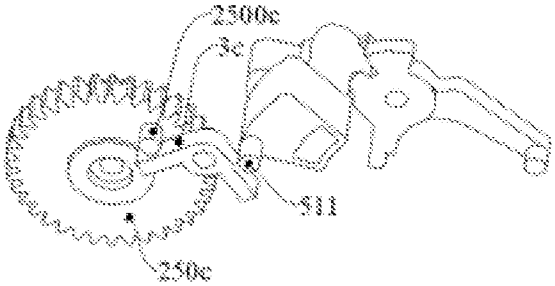
FIG. 12B is a structure diagram where the fourth transmission gear of the transmission gear set drives the lock catch through the trip-off lever in the sixth embodiment of the circuit breaker of the present invention.

As shown in FIGS. 12A and 12B, the sixth embodiments of the invention cutter is provided.

This embodiment is different from the fourth embodiment in that: the electric mechanism 2*c* also includes the fourth transmission gear 250*c* is coaxial linkage with the first fan-shaped gear 251*c*, the transmission member 4 is arranged coaxially with the transmission member's gear 27*c*, the operating mechanism also includes the trip-off lever 3*c* drivingly connected to the lock catch 51 and pivotally arranged; when the circuit breaker switches on, the first fan-shaped gear 251*c* rotates from the third initial position toward the second direction to its engagement with the transmission member's gear 27*c* and drives the transmission member's gear 27*c* to rotate from the second initial position toward the first direction, thus the transmission member's gear 27*c* drives the transmission member 4 to rotate in the first direction, the circuit breaker switches on and the first fan-shaped gear 251*c* rotates to its disengagement from the transmission member's gear 27*c*, then the transmission member's gear 27*c* automatically rotates to the second initial position and the transmission member 4 stays at the position by which the transmission member 4 stands on the moment that the circuit breaker switches on (That is, in the first direction, the transmission member's gear 27*c* coaxially interacts with the transmission member 4; in the second direction, the transmission member's gear 27*c* can automatically rotate in the second direction and return back to the second initial position when the transmission member 4 stays still); when the circuit breaker switches off, the first fan-shaped gear 251*c* and the fourth transmission gear 250*c* continue to rotate in the second direction, the fourth transmission gear 250*c* drives the trip-off lever 3*c* to rotate, the trip-off lever 3*c* drives the lock catch 51 to rotate in the second direction, so as to release the locking co-operation of the lock catch 51 with the jump buckle 50, thus the circuit breaker switches off and the first fan-shaped gear 251*c* continues to rotate to the third initial position that nearly engages with the transmission member's gear 27*c* but not yet engages with it. Further, the electric mechanism 2*c* also includes the transmission member's gear resetting spring used to reset the transmission member's gear 27*c*.

Specifically, as shown in FIG. 12A, the circuit breaker is in the switch-on state, the transmission member's gear 27*c* is at the second initial position, the first fan-shaped gear 251*c* is disengaged from the transmission member's gear 27*c*, when the circuit breaker switches off, the driving motor 20*c* drives the fourth transmission gear 250*c* and the first fan-shaped gear 251*c* to rotate synchronously counterclockwise, and the fourth transmission gear 250*c* drives the lock catch 51 to rotate counterclockwise through the trip-off lever 3*c* during its rotation process, to enable the lock catch 51 to release its locking co-operation with the jump buckle 50, thus the circuit breaker switches off and the first fan-shaped gear 251*c* continues to the third initial position (the same as shown in FIG. 11A); referring to FIG. 11A, when the circuit breaker is in the switch-off state, the first fan-shaped gear 251*c* is at the third initial position, the transmission member's gear 27*c* is at the second initial position, and the first fan-shaped gear 251*c* does not engage with the transmission member's gear 27*c*; when the circuit breaker switches on, the driving motor 20*c* drives the first fan-shaped gear 251*c* to rotate counterclockwise to its engagement with the transmission member's gear 27*c* and drives the transmission member's gear 27*c* to rotate clockwise, thus the transmission member's gear 27*c* is driven and enables the transmission member 4 to rotate clockwise, referring to FIG. 11B, the circuit breaker switches on and the first fan-shaped gear 251*c* rotates to its disengagement from the transmission member's gear 27*c*, afterward as shown in FIG. 12A, the transmission member's gear 27*c* can be driven by the transmission member's gear resetting spring to automatically return to the second initial position, and the transmission member 4 stays at the switch-on position.

Preferably, as shown in FIG. 12B, an embodiment of the trip-off lever 3*c* is provided.

As shown in FIG. 12B, the trip-off lever 3*c* is pivotally installed inside the circuit breaker housing 1, and has the two ends co-operated with the fourth transmission gear 250*c* and the lock catch 51 respectively; the backside of the lock catch 51 is provided with the lock catch driving protrusion 511 correspondingly co-operated with one end of the trip-off lever 3*c*; the backside of the fourth transmission gear 250*c* is provided with the fourth transmission gear driving protrusion 2500*c* correspondingly co-operated with the other end of the trip-off lever 3*c*; as shown in FIG. 12A, when the circuit breaker switches off, the driving motor 20*c* drives the first fan gear 251*c* and the fourth transmission gear 250*c* to rotate counterclockwise (clockwise as shown in FIG. 12B); the fourth transmission gear driving protrusion 2500*c* drives the trip-off lever 3*c* to rotate clockwise (counterclockwise as shown in FIG. 12B); the trip-off lever 3*c* drives the lock catch 51 to rotate counterclockwise (clockwise as shown in FIG. 12B), so as to be set off to trip off and switch off. Further, as shown in FIG. 12B, the trip-off lever 3*c* has a V-shaped structure, and a trip-off lever axle hole in its middle portion. Of course, the trip-off lever 3*c* may also adopt other similar structures.

Preferably, the transmission gear set of this embodiment has the same structure as that of the fourth embodiment.

As shown in FIGS. 1 and 9-13A, the seventh embodiment of the circuit breaker of the present invention is provided.

The circuit breaker of the present invention further includes the arc extinguishing system 8, the short-circuit protection mechanism 7 and the overload protection mechanism 9 drivingly cooperated with the operating mechanism respectively, the wire-inlet terminal 1*i* and the wire-outlet terminal 10, which are arranged in the circuit breaking housing; the wire-outlet terminal 10 and the button mechanism 2 are arranged at one end of the circuit breaker housing 1, and the wire-inlet terminal 1*i* is arranged at the other end of the circuit breaker housing 1; the arc extinguishing system 8 and the short-circuit protection mechanism 7 are arranged side by side between the operating mechanism and the wire-inlet terminal 1*i*, and the electric mechanism 2*c* and the overload protection mechanism 9 are positioned on one side of the operating mechanism and between the arc extinguishing system 8 and the wire-outlet terminal 10. Further, as shown in FIG. 1, the button mechanism 2 is arranged opposite to the short-circuit protection mechanism 7 and positioned on one side of the circuit breaker housing 1; the wire-outlet terminal 10 and the arc extinguishing system 8 are arranged opposite to each other and positioned on the other side of the circuit breaker housing 1. Specifically, as shown in FIG. 1, the upper, lower, left, and right sides of FIG. 1 corresponding to the upper, lower, left, and right sides of the circuit breaker respectively, and the side of FIG. 1 facing the reader corresponds to the front side of the circuit breaker; the wire-outlet terminal 10 and the button mechanism 2 are arranged side by side on the upper end of the circuit breaker housing 1, and the wire-outlet terminal 1*i* is arranged at the lower end of the circuit breaker housing 1; the arc extinguishing system 8 and the short-circuit protection mechanism 7 are arranged side by side between the operating mechanism and the wire-inlet terminal 1*i*, and the electric mechanism 2*c* and the overload protection mechanism 9 are positioned on the left side of the operating mechanism and between the arc extinguishing system 8 and the wire-outlet terminal 10.

Figure 14:
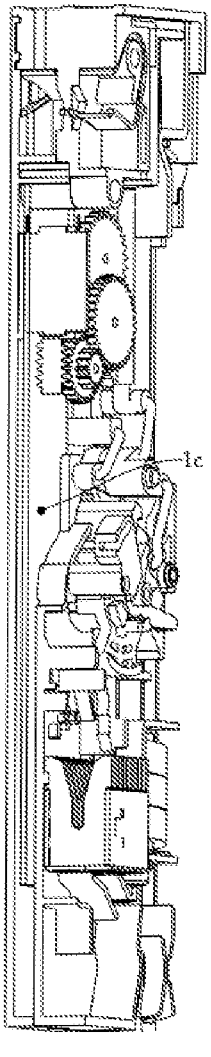
FIG. 14 is a structure diagram of the of the circuit breaker of the present invention, showing the position of the control circuit board.

Preferably, as shown in FIGS. 1 and 14, the circuit breaker further includes the control circuit board 1*c* connected to the electric mechanism 2*c*.

Preferably, as shown in FIG. 1, the control circuit board 1*c* is arranged between the bottom plate of the circuit breaker housing 1 and the electric mechanism 2*c*, the control circuit board 1*c* and the electric mechanism 2*c* are positioned on the same side of the operating mechanism, and the control circuit board 1*c* is positioned between the wire-outlet terminal 10 and the arc extinguishing system 8. Specifically, as shown in FIG. 1, the upper, lower, left, and right sides of FIG. 1 correspond to the upper, lower, left, and right sides of the circuit breaker, respectively, and the side of FIG. 1 facing the reader corresponds to the front side of the circuit breaker. The control circuit board 1*c* and the electric mechanism 2*c* are positioned on the left side of the button mechanism 2 of the operating mechanism, the control circuit board 1*c* is positioned on the front side of the bottom plate of the circuit breaker housing 1, and the electric mechanism 2*c* is positioned on the front side of the control circuit board 1*c*. The control circuit board 1*c* basically overlaps the electric mechanism 2*c*, so the space of the circuit board is small.

Preferably, as shown in FIG. 1, the circuit breaker further includes the signal terminal connected to the control circuit board 1*c*, the signal terminal and the wire-inlet terminal 1*i* are arranged at the same end of the circuit breaker housing 1, and the signal terminal is positioned between the two wire-inlet terminals 1*i*.

Preferably, as shown in FIG. 13A, the short-circuit protection mechanism 7 is an electromagnetic release.

Preferably, as shown in FIG. 13A, the overload protection mechanism 9 is a manganin resistor in series connection with the L-pole circuit of the circuit breaker, and the manganin resistor is connected to the control circuit board 1*c*, and transmits signals to the control circuit board 1*c*. If an overload fault occurs, the electric mechanism 2*c* drives the circuit breaker to switch off.

Preferably, the overload protection mechanism 9 is a current transformer coupled to the L-pole circuit of the circuit breaker and connected to the control circuit board 1*c*, and the current transformer collects the current signals of the L-pole circuit and transmits them to the control circuit board 1*c*. When an overload fault occurs, the electric mechanism 2*c* drives the circuit breaker to switch off.

Preferably, the overload protection mechanism 9 is a bimetallic strip drivingly co-operated with the jump buckle 51. When an overload fault occurs, the bimetallic strip bends and drives the jump buckle 51 to rotate, so that the lock catch 50 and the jump buckle 51 release the locking co-operation with each other, and the circuit breaker switches off.

Preferably, as shown in FIG. 1, the circuit breaker housing 1 includes the wire-inlet terminal hole 14 and the signal terminal hole 15 arranged at one end thereof, and the wire-outlet terminal hole, the first button hole and the second button hole arranged at the other end of the circuit breaker housing 1. The wire-inlet terminal, the signal terminal and the wire-outlet terminal are arranged in the corresponding openings, respectively; of the first button 20, one end is slidably arranged in the first button hole, and the other end is connected with the first connecting rod 30; and of the second button 21, one end is slidably arranged in the second button hole, and the other end is connected with the second connecting rod 31.

As the control circuit board 1*c* not only needs to be connected to the electric mechanism 2*c* and the overload protection mechanism 9 (such as a manganin resistance or a current transformer), but also needs to be connected to the wire-inlet terminal 1*i* to take electricity, and to the signal terminal to transmit signals. If the control circuit board 1*c* adopts the embodiment shown in FIG. 1, when the control circuit board 1*c* is connected with the wire-inlet terminal 1*i* and the signal terminal, wiring will run far away and connects with flexible wires, resulting in the more troubles in wiring and welding during assembly. Thus, whether manual assembly or automatic assembly, it is difficult to control the position of the wires.

Preferably, as shown in the preferred embodiment of the control circuit board 1*c* shown in FIG. 14, the bottom plate of the circuit breaker housing 1 is positioned on one side of the control circuit board 1*c*, and the electric mechanism 2*c*, the operating mechanism and the arc extinguishing system 8 are positioned on the other side of the control circuit board. The control circuit board 1*c* extends at least beyond the short-circuit protection mechanism 7 and the arc extinguishing system 8 and is adjacent to the wire-inlet terminal 1*i* and the signal terminal, and the printed wires extending beyond the arc extinguishing system 8 and used to connect with the wire-inlet terminal 1*i* and the signal terminal are arranged on the control circuit board 1*c*. Specifically, as shown in FIG. 1, the upper, lower, left, and right sides of FIG. 1 correspond to the upper, lower, left, and right sides of the circuit breaker, respectively. The bottom plate of the circuit breaker housing 1 is positioned on the left side of the control circuit board 1*c*, and the electric mechanism 2*c*, the operating mechanism and the arc extinguishing system 8 are positioned on the right side of the control circuit board. Further, the button mechanism 2 and the short-circuit protection mechanism 7 are both directly arranged on the bottom plate of the circuit breaker housing 1. It should be pointed out that, according to actual needs, the button mechanism 2 and the short-circuit protection mechanism 7 can also be arranged on the other side of the control circuit board 1*c*, in the same way as the electric mechanism 2*c*, the operating mechanism, and the arc extinguishing system 8, so as to further expand the installation space for the control circuit board 1*c*.

We have made further detailed description of the present invention mentioned above in combination with specific preferred embodiments, but it is not deemed that the specific embodiments of the present invention is only limited to these descriptions. A person skilled in the art can also, without departing from the concept of the present invention, make several simple deductions or substitutions, which all be deemed to fall within the protection scope of the present invention.

What is claimed is:

1. A circuit breaker, comprising a circuit breaker housing; and a button mechanism, an operating mechanism connected with said button mechanism, a movable contact connected with said operating mechanism and a static contact co-operated with said movable contact are all arranged in said circuit breaker housing; wherein operating said button mechanism enables the circuit breaker to switch on/switch off by means of said operating mechanism; the circuit breaker further includes an electric mechanism arranged inside said circuit breaker housing, said electric mechanism is drivingly co-operated with said button mechanism or said operating mechanism, said electric mechanism can actuate the circuit breaker to switch on/switch off by means of said operating mechanism, or said electric mechanism can actuate the circuit breaker to switch on/switch off by means of said button mechanism, wherein the circuit breaker further includes a short-circuit protection mechanism and an overload protection mechanism respectively drivingly co-operated with said operating mechanism, arc extinguishing system, a wire-inlet terminal and a wire-outlet terminal, which are arranged in the circuit breaker housing respectively; said wire-outlet terminal and said button mechanism are arranged at one end of said circuit breaker housing, and said wire-inlet terminal is arranged at another end of said circuit breaker housing; said operating mechanism is positioned between said button mechanism and said wire-inlet terminal; said arc extinguishing system and said short-circuit protection mechanism are arranged side by side between said operating mechanism and said wire-inlet terminal; said electric mechanism is positioned between said operating mechanism and said wire-outlet terminal, and said electric mechanism and said wire-outlet terminal are positioned on a same side of said button mechanism; said overload protection mechanism is positioned on one side of said operating mechanism and between said arc extinguishing system and said wire-outlet terminal.

2. The circuit breaker according to claim 1, wherein said operating mechanism includes a bar linkage, and a transmission member and a lever mechanism pivotally arranged on the circuit breaker housing, said bar linkage includes a connecting rod structure and a transmission connecting rod; said button mechanism is drivingly connected to said transmission member through said connecting rod structure, said transmission member is drivingly connected to said lever mechanism through said transmission connecting rod, and said lever mechanism is drivingly connected with said movable contact; when operating said button mechanism to enable the circuit breaker to switch on/switch off, said button mechanism drives said transmission member to rotate in a first direction/a second direction through said connecting rod structure, and said second direction and said first direction are opposite to each other.

3. The circuit breaker according to claim 2, wherein said button mechanism includes a first button slidably arranged inside said circuit breaker housing, said connecting rod structure includes a first connecting rod, said first button is drivingly connected to said transmission member through said first connecting rod; when pressing said first button toward the inside of said circuit breaker housing to enable the circuit breaker to switch on, said first button drives said transmission member to rotate in said first direction; when pulling said first button toward an outside of said circuit breaker housing to enable the circuit breaker to switch off, said first button drives said transmission member to rotate in said second direction; said electric mechanism is drivingly cooperated with said first button to drive the circuit breaker to switch on/switch off.

4. The circuit breaker according to claim 3, wherein said electric mechanism includes a driving motor, a transmission gear set and a transmission rack, said driving motor is drivingly co-operated with said transmission rack through said transmission gear set, and said transmission rack is drivingly co-operated with said button mechanism.

5. The circuit breaker according to claim 4, wherein said first button includes a rack limiting groove arranged on one side thereof, said transmission rack is arranged in said rack limiting groove, and said rack limiting groove includes a switch-on side surface and a switch-off side surface respectively arranged at both ends thereof; when the circuit breaker switches on, said transmission rack moves from a first initial position toward said switch-on side surface till said transmission rack contacts with the latter, then said transmission rack continues to move and drives said first button to move toward the inside of said circuit breaker housing through said switch-on side surface, after the circuit breaker has switched on, said transmission rack returns back to said first initial position; when the circuit breaker switches off, said transmission rack moves toward said switch-off side surface to contact with the latter, then said transmission rack continues to move and drives said first button to move toward the outside of said circuit breaker housing through said switch-off side surface, after the circuit breaker has switched off, said transmission rack returns back to said first initial position.

6. The circuit breaker according to claim 4, wherein said first button and said transmission rack are fixedly connected to each other, and said transmission gear set includes a first fan-shaped gear drivingly engaged with said transmission rack; when the circuit breaker switches on, said first fan-shaped gear rotates in said first direction and drives said first button to move toward the inside-of said circuit breaker housing through said transmission rack, thus the circuit breaker switches on and said first fan-shaped gear rotates until said first fan-shaped gear disengages from said transmission rack; when the circuit breaker switches off, said first fan-shaped gear rotates in said second direction and drives said first button to move toward the outside of said circuit breaker housing through said transmission rack, thus the circuit breaker switches off and said first fan-shaped gear rotates until said first fan-shaped gear disengages from said transmission rack.

7. The circuit breaker according to claim 2, wherein said button mechanism includes a first button and a second button slidably arranged inside said circuit breaker housing respectively, and said first button and said second button are parallelly arranged and synchronously move in two directions opposite to one another; said connecting rod structure includes a first connecting rod and a second connecting rod, said first button is drivingly connected to said transmission member through said first connecting rod, and said second button is drivingly connected to said transmission member through said second connecting rod; when pressing said first button toward the inside of said circuit breaker housing to enable the circuit breaker to switch on, said first button drives said transmission member to rotate in said first direction, meanwhile said second button moves toward an outside of the circuit breaker; when pressing said second button toward the inside of said circuit breaker housing to enable the circuit breaker to switch off, said second button drives said transmission member to rotate in the second direction through said second connecting rod, meanwhile said first button moves toward the outside of the circuit breaker; the electric mechanism drivingly cooperates with said first button or said second button to enable the circuit breaker to switch on/switch off.

8. The circuit breaker according to claim 2, wherein said electric mechanism is drivingly co-operated with said transmission member to drive the circuit breaker to switch on/switch off; said electric mechanism includes a driving motor, a transmission gear set and a transmission member's gear coaxially arranged with said transmission member, and said transmission gear set includes a switch-on and switch-off driving gear drivingly co-operated with said transmission member's gear; said switch-on and switch-off driving gear drives said transmission member's gear to rotate, and said transmission member's gear drives said transmission member to rotate, so as to enable the circuit breaker to switch on/switch off.

9. The circuit breaker according to claim 2, wherein said operating mechanism further includes a jump buckle, a lock catch and a rotating plate pivotally arranged on said circuit breaker housing, said jump buckle and said lock catch are pivotally arranged on said rotating plate respectively, said jump buckle and said lock catch are locked with each other, and said rotating plate is drivingly connected with said movable contact; said electric mechanism is drivingly co-operated with said transmission member to drive the circuit breaker to switch on, and with said lock catch to drive the circuit breaker to trip to switch off; said electric mechanism includes a driving motor, a transmission gear set and a transmission member's gear coaxially arranged with said transmission member, and said transmission gear set includes a fourth transmission gear drivingly co-operated with said transmission gear and a first fan-shaped gear is coaxially linked with said fourth transmission gear; said operating mechanism further includes a trip-off lever drivingly connected to said lock catch and pivotally arranged; said fourth transmission gear drives said trip-off lever to rotate, and said trip-off lever simultaneously drives said lock catch to rotate, so as to release the locking co-operation of said lock catch with said jump lock and enable the circuit to switch off; when the circuit breaker switches on, said first fan-shaped gear rotates from a third initial position toward said second direction to engage with said transmission member's gear and drives said transmission member's gear to rotate from a second initial position toward said first direction, said transmission member's gear drives said transmission member to rotate in said first direction, the circuit breaker switches on and said first fan-shaped gear rotates until said first fan-shaped gear disengages from said transmission member's gear, then said transmission member's gear automatically rotates back to said second initial position and said transmission member stays at a position by which said transmission member stands on a moment that the circuit breaker switches on; when the circuit breaker switches off, said first fan-shaped gear and said fourth transmission gear continue to rotate in said second direction, said fourth transmission gear drives said trip-off lever to rotate, said trip-off lever drives said lock catch to rotate, so as to release the locking co-operation of said lock catch with said jump buckle, thus the circuit breaker switches off and said first fan-shaped gear continues to rotate to said third initial position.

10. The circuit breaker according to claim 1, wherein the circuit breaker further includes a control circuit board connected to said electric mechanism; said control circuit board is arranged between a bottom plate of said circuit breaker housing and said electric mechanism, said control circuit board and said electric mechanism are positioned on the same side of said button mechanism, and said control circuit board is positioned between said wire-outlet terminal and said operating mechanism.

11. The circuit breaker according to claim 1, wherein the circuit breaker further includes a control circuit board connected to said electric mechanism; a bottom plate of said circuit breaker housing is positioned on one side of said control circuit board, and said electric mechanism, said operating mechanism and said arc extinguishing system are positioned on another side of said control circuit board.

12. The circuit breaker according to claim 1, wherein said button mechanism is arranged opposite to said short-circuit protection mechanism and positioned on one side of said circuit breaker housing; said wire-outlet terminal is arranged opposite to said arc extinguishing system and positioned on another side of said circuit breaker housing.

13. The circuit breaker according to claim 1, wherein said short-circuit protection mechanism is an electromagnetic release; said overload protection mechanism is a bimetallic strip drivingly co-operated with said jump buckle of said operating mechanism, or said overload protection mechanism is a current transformer coupled to an L-pole circuit of the circuit breaker and connected to a control circuit board, or said overload protection mechanism is a manganin resistor in series connection with the L-pole circuit of the circuit breaker, and said manganin resistor is connected to said control circuit board; the circuit breaker further includes said control circuit board connected to said electric mechanism and a signal terminal connected to said control circuit board, said signal terminal and said wire-inlet terminal are arranged at a same end of said circuit breaker housing, and said signal terminal is positioned between two said wire-inlet terminals.

* * * * *